(12) United States Patent
Phuly

(10) Patent No.: US 6,601,312 B1
(45) Date of Patent: Aug. 5, 2003

(54) METHOD AND APPARATUS FOR UNIVERSAL SHAPE CUTTING OF PIPES

(76) Inventor: Ahmed M. Phuly, 152 - 122$^{nd}$Ave. NW., Coon Rapids, MN (US) 55448

( * ) Notice: Subject to any disclaimer, the term of this patent is extended or adjusted under 35 U.S.C. 154(b) by 0 days.

(21) Appl. No.: 10/084,124

(22) Filed: Feb. 25, 2002

Related U.S. Application Data

(60) Provisional application No. 60/326,082, filed on Sep. 29, 2001.

(51) Int. Cl.$^7$ ................................................ G01B 5/20
(52) U.S. Cl. ........................... 33/529; 33/561.1; 33/412
(58) Field of Search .......................... 33/529, 1 G, 412, 33/533, 613, 626, 628, 632, 638, 645, 561.1, 561.2, 561.3, DIG. 1, 18.1, 27.01, 27.12

(56) References Cited

U.S. PATENT DOCUMENTS

| | | | | |
|---|---|---|---|---|
| 776,713 A | * | 12/1904 | Wurts | ........................... 33/529 |
| 2,155,705 A | | 4/1939 | Gottwald | |
| 2,466,464 A | | 4/1949 | Moore | |
| 2,487,944 A | * | 11/1949 | Pressman | ................... 33/561.1 |
| 2,522,030 A | * | 9/1950 | Fuqua | .......................... 33/561 |
| 2,615,255 A | | 10/1952 | Rankin | |
| 2,621,415 A | * | 12/1952 | Cooper | ...................... 33/561.1 |
| 2,671,273 A | | 3/1954 | Barnes | |
| 2,671,967 A | * | 3/1954 | Giudice | ..................... 33/561.1 |
| 2,704,893 A | * | 3/1955 | Shane | ......................... 425/262 |
| 2,742,706 A | | 4/1956 | Rushing, Jr. | |
| 3,419,965 A | | 1/1969 | Madden | |
| 4,419,828 A | | 12/1983 | Farris | |
| 4,807,369 A | | 2/1989 | Ming-Chin | |
| 4,876,758 A | * | 10/1989 | Rolloff et al. | ............ 12/142 N |
| 6,209,215 B1 | | 4/2001 | Helms | |

FOREIGN PATENT DOCUMENTS

GB 2243216 A * 10/1991

OTHER PUBLICATIONS

Web page for H & M Pipe Beveling Machine Company, Inc. (4pp.).

* cited by examiner

Primary Examiner—Diego Gutierrez
Assistant Examiner—Tania C. Courson
(74) Attorney, Agent, or Firm—Nikolai & Mersereau, P.A.

(57) ABSTRACT

The present invention pertains to a method and apparatus for obtaining templates used in pipe end cutting essential in fabricating saddle and mitered pipe connections. The template is made by an array of z-shaped pins arranged radially to form the shape of a stepped cylinder. A flexible adjustable length track on the z shaped pins or on another set of pins forms a track for a roller on a tool to follow. This track replaces metal templates, which have to be specially made for cutting each shape and size pipe for pipe connections to other pipes or to boilers and other devices. The invention provides a large array of templates for one or more sizes of pipe eliminating the need to have a large number of templates for different pipe sizes and shapes. A miter table attachment can be used for off center pipe connection cuts.

27 Claims, 28 Drawing Sheets

METHOD AND APPARATUS FOR UNIVERSAL SHAPE CUTTING OF PIPES

BACKGROUND OF THE INVENTION

1. Field of the invention

This invention relates to a method and apparatus for pipe-end shaping and welding for pipe connections and more particularly to a plurality of pins having a track on one end for forming a template for pipe end shapes. The pins engage the contour of the surface to be cut or welded.

2. Description of the Related Art

In many industrial applications, such as mechanical piping, pressure vessels and steel construction, it is often necessary to join one pipe to another or to other receiving components. The pipe fitting process usually involves shape cutting of the pipe end. The cutting is always done so that the pipe end contour matches the geometry of intersection of the pipe with the other receiving component. The fabrication process may also require beveling the pipe end along the cut line in order to receive the proper welding.

The most commonly used tools for cutting and beveling pipe ends are pipe beveling machines, also known as short saddle machines. Some of the commercially available pipe beveling machines are equipped to receive shape cutting attachments known as guide templates or shape cutting attachments. These metal guide templates allow the user to cut and bevel contoured pipe ends for saddle connections such as T-joints and miter angles. Shape cutting attachments are always of cylindrical shape with one end contoured, and the other end equipped with a set of small bolting brackets. The square end is fitted to the face of the beveling machine, then the torch ruler of a short saddle machine is engaged with the contoured edge of the metal guide. With the torch ignited, the torch arm mechanism is rotated using manual or mechanical devices. A spring tension, exerted on the roller, causes the roller to follow the shaped end of the metal template, duplicating the shape of the pattern.

A pre-fabricated template is used to produce a single specific shape-cut. To cut a pipe end to take a specific contour, a specific corresponding guide template will have to be used. The fabricator can not use a pipe-beveling machine to cut or bevel pipe ends to shape, if the corresponding metal guide template is not available. This drawback limits the fabricator's options to either shape-cut pipes using a hand held torch or to keep on hand a large number of guide templates. Hand held torch cutting does not yield accurate results and usually requires additional grinding and filing. It is also very difficult to maintain a beveling angle while using a hand held torch. The process of custom making a metal guide template is complicated and involves several steps. The first step involves drawing the unfolded shape of the guide template. The next steps are marking, cutting, rolling and welding a metal sheet. The process of drawing the unfolded shape of the template requires a great deal of knowledge of descriptive geometry methods and manual or CAD drafting. Programmable pipe shape cutters are very expensive and require highly skilled workers to operate. Programmable pipe shape-cutters usually produce a limited number of standard shape cuts corresponding to commonly used pipe connections.

The prior art, involving layout of pipe connection templates, may require both joining components to be brought together and positioned at the desired orientation with respect to each other. That process requires both time and physical effort. The effort involves moving, lifting, and building temporary fixtures to hold both joining components in a specific position. It also requires tedious measuring. The larger the size of the joining components, the greater the amount of physical work involved.

Both manual and CAD drafting methods can be utilized to derive the unfolded shape of the widely used metal guide template, from the pipe connection template however this prior art is considered tedious and time consuming.

BRIEF SUMMARY OF THE INVENTION

The present invention pertains to an apparatus and a method for fabricating pipe connections involving pipe-end shape cutting. It provides a cost-effective system for pipe end universal shape cutting and beveling. In one embodiment of the invention the system 1 consists of three devices referred to as: (a) the universal template, (b) the template adapter and (c) the miter table. The three mentioned devices work together and inter-connect. An aspect of this invention is to allow a cutting torch of a pipe saddle machine to follow a flexible track, cutting and beveling a pipe end for a smooth shape-cut. The flexible track can be secured in place to form any shaped smooth surface guide template. One objective of the present invention is to eliminate the need to keep on hand a large number of pre-fabricated metal guides.

The universal template is generally shown is shown in FIG. 1 as 1A. It comprises a plurality of pins arrayed in a the shape of a cylinder, a pin sleeve with a locking mechanism to hold the pins in place, an adjustable flexible moving track on one end of the pins, and stationary cylindrical sleeve with a mounting flange for attaching a working tool.

The universal template relies on a template adapter, to generate the shape of the track template. The current invention relates to a method of generating the track template for any given pipe end shape-cut, using the template adapter. The template adapter is made of a full array of Z-shaped pins arranged radially to form the shape of a stepped cylinder. One side of the template adapter has a diameter equal to the outer diameter of the pipe, while the other side has a diameter equal to the stationary pipe sleeve of the universal template. As the narrow side of the adapter takes the shape of the connection template, the pins will slide, along the adapter's wide sleeve and the adapter's narrow sleeve, allowing the wide side to take the shape of the desired track template. The track template is transferred onto the universal template to be used for shape cutting. The template adapter provides a simple and direct generation of the desired track template. The objective of the template adapter is to eliminate the complex process of deriving and drawing the unfolded shape of a guide template.

The template adapter can be used with a miter table for a precise and quick method of relative positioning of the template adapter with respect to a receiving component or its representative. The miter table provides means for quick relative positioning of the template adapter with respect to a receiving object, allowing the template adapter to generate both connection templates and track templates for miter cuts, concentric, or offset pipe connections.

The template adaptor can be used with a set of lightweight curved plates employed with the system 1 or 1' for the template generating process. Each curved plate represents a portion of a large pipe or a large diameter shell such as a boiler. Each of the said curved plates is labeled with a size tag showing the nominal or actual diameter of the represented shell. The curved plates are made of plastic or light metal and cover a wide range of pipe and large shell diameters. The objectives of the lightweight plates are to minimize the physical effort involved in the fabrication process, and to generate the connection and track templates without having the two joining components present during that process.

OBJECTS OF THE INVENTION

It is an object of the invention to provide a smooth and acurate shape track for cutting, beveling and welding tools to follow to better quality pipe connections.

It is an object of the invention to improve shape transfers from one surface to another.

It is an object of the invention to eliminate trace approximations caused by of pins causing a step function trace.

It is an object of the invention to improve the quality and accuracy of cutting beveling and welding pipe connections.

It is an object of the invention to position offsets of pipes with greater accuracy when connecting the pipes.

It is an object of the invention to eliminate the use of paper templates.

It is an object of the invention to eliminate shape cutting using a hand held torch.

It is an object of the invention to eliminate the need to have multiple sets of metal templates used to cut pipe connections.

It is an object of the invention to eliminate errors introduced by multiple steps of approximations in cutting pipes for pipe connections.

It is an object of the invention to bevel pipes at correct angles for improved fits of pipes in pipe connections.

It is an object of the invention to improve the weld quality of pipe connections to eliminate leaks and reworking of welds.

It is an object of the invention to form templates for and cut complicated pipe ends.

It is an object of the invention to automatically cut pipe ends from a template for (non standard) pipe connections, including connections with the receiving component having an irregular geometry.

It is an object of the invention to prepare pipe connections without having the receiving component present.

It is an object of the invention to produce templates for cutting large sized pipe ends where the pipes from curved plates avoiding having to work with large heavy pipes.

It is an object of the invention to improve the quality of fabrication of pipe connections comprising acute angles or offsets or a combination of both.

It is an object of the invention to increase the productivity of pipe connection layout and fabrication.

It is an object of the invention to use one device to prepare a pipe end by shape cutting, beveling, (or welding), covering a wide range of pipe sizes and connection configurations for both field and shop fabrication.

Other objects, advantages and novel features of the present invention will become apparent from the following description of the preferred embodiments when considered in conjunction with the accompanying drawings.

BRIEF DESCRIPTION OF THE INVENTION

Figure 13:
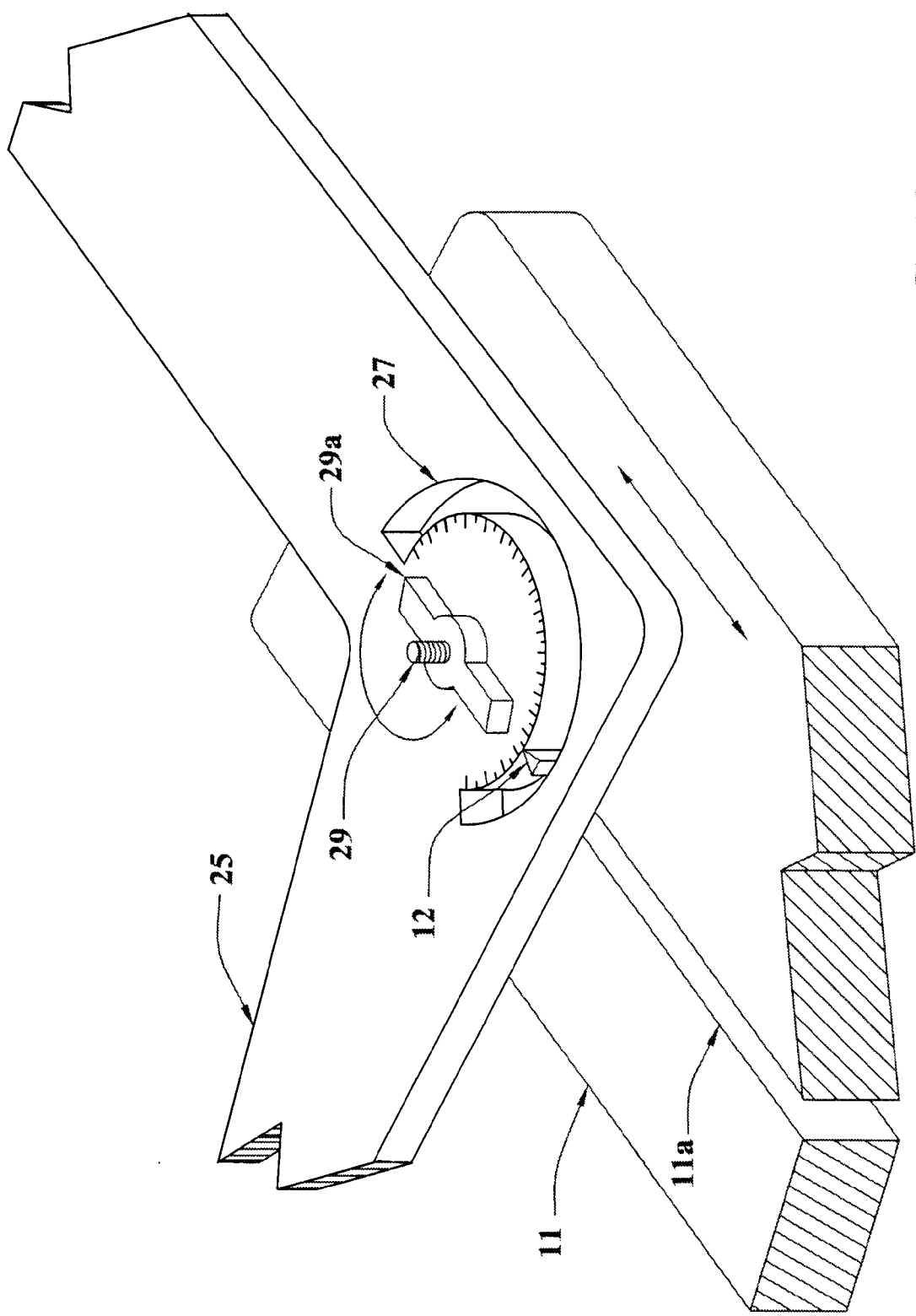

FIG. 13 shows an enlarged view of the rigid handle 25 of a template adapter 1B connected to the column 11 of a miter table 1C and the possible relative motion and rotation. The angle indicator 12 reading miter or connection angles at the C-shaped protractor window 27.

Figure 14:
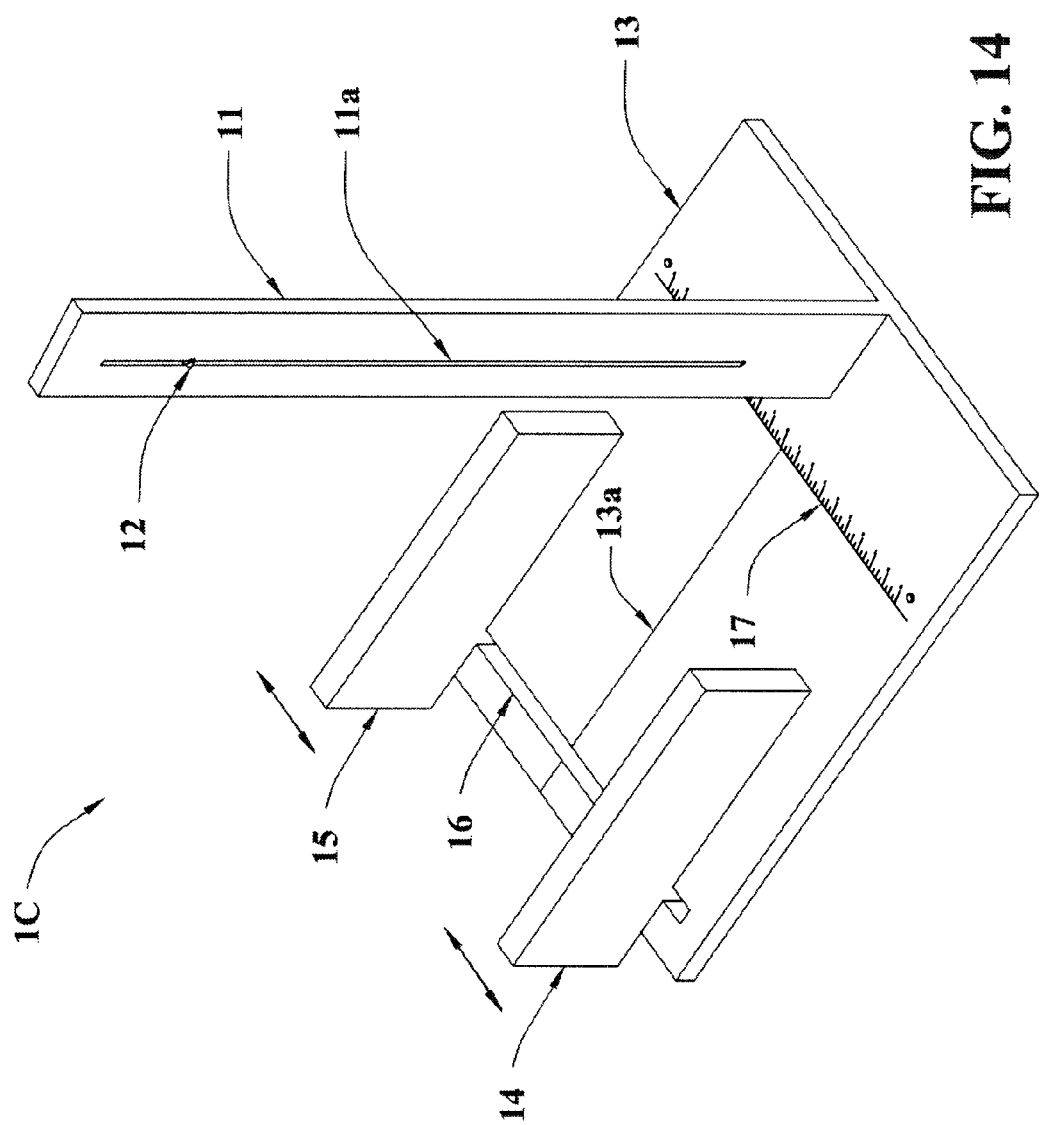

FIG. 14 shows an isometric view of the miter table 1C with directions of possible movements of the guides.

Figure 15:
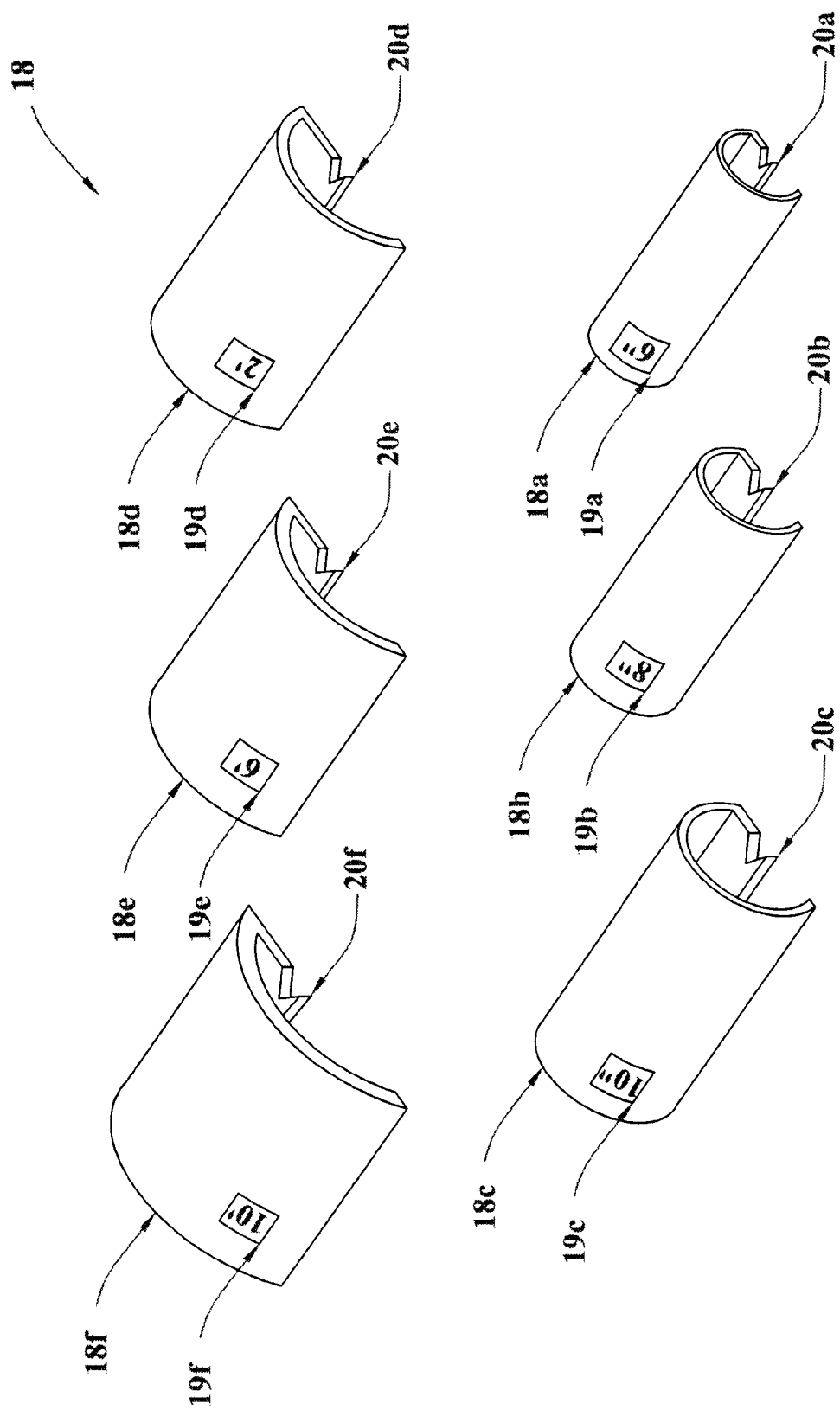

FIG. 15 shows a part of a set lightweight, flat bottom partial pipes or curved plates resembling the geometry of standard pipes and large diameter shells.

Figure 16:
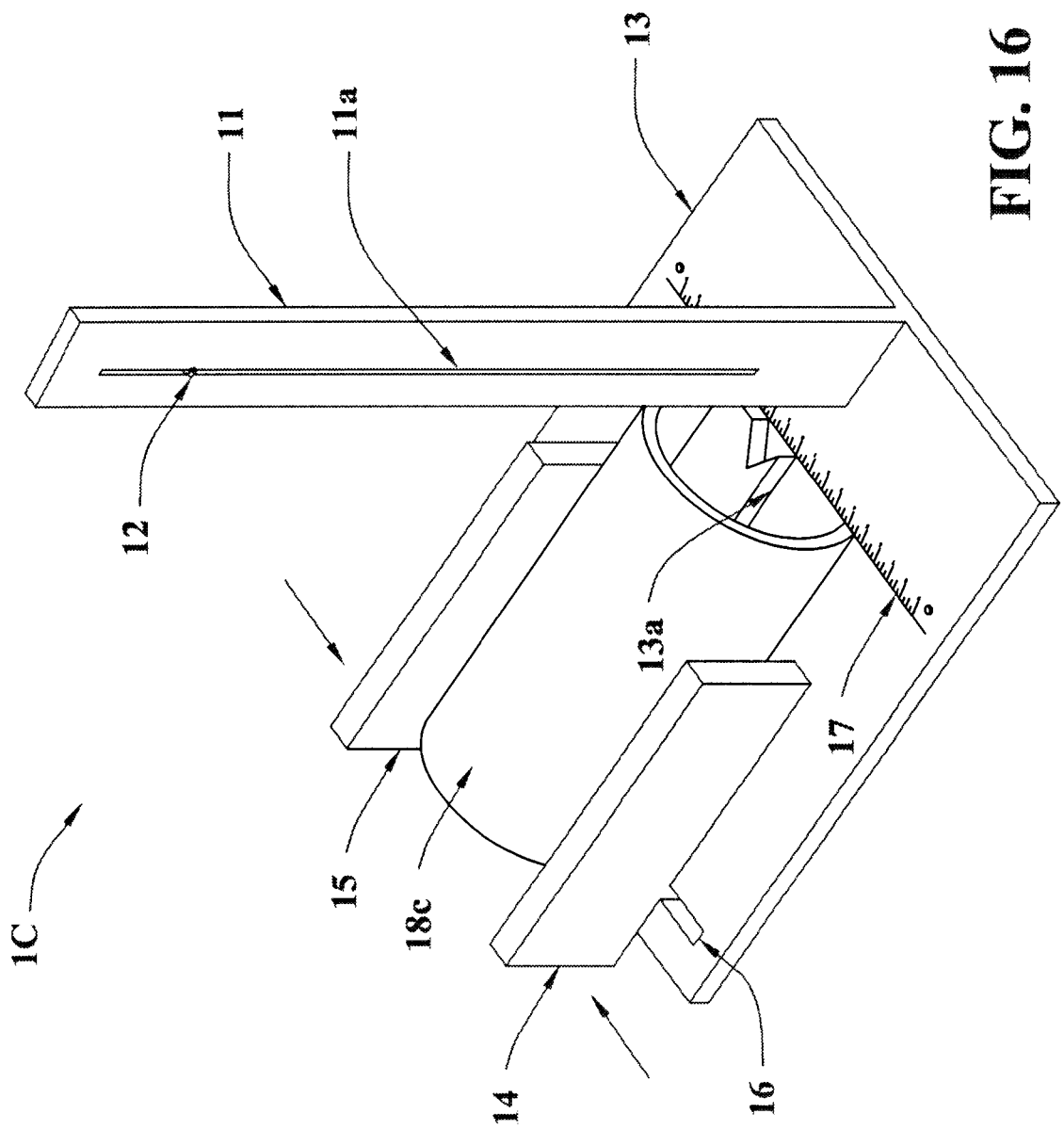

FIG. 16 shows an isometric view of the miter table 1C with a curved plate placed on the flat top of the table and positioned at a zero offset.

Figure 17:
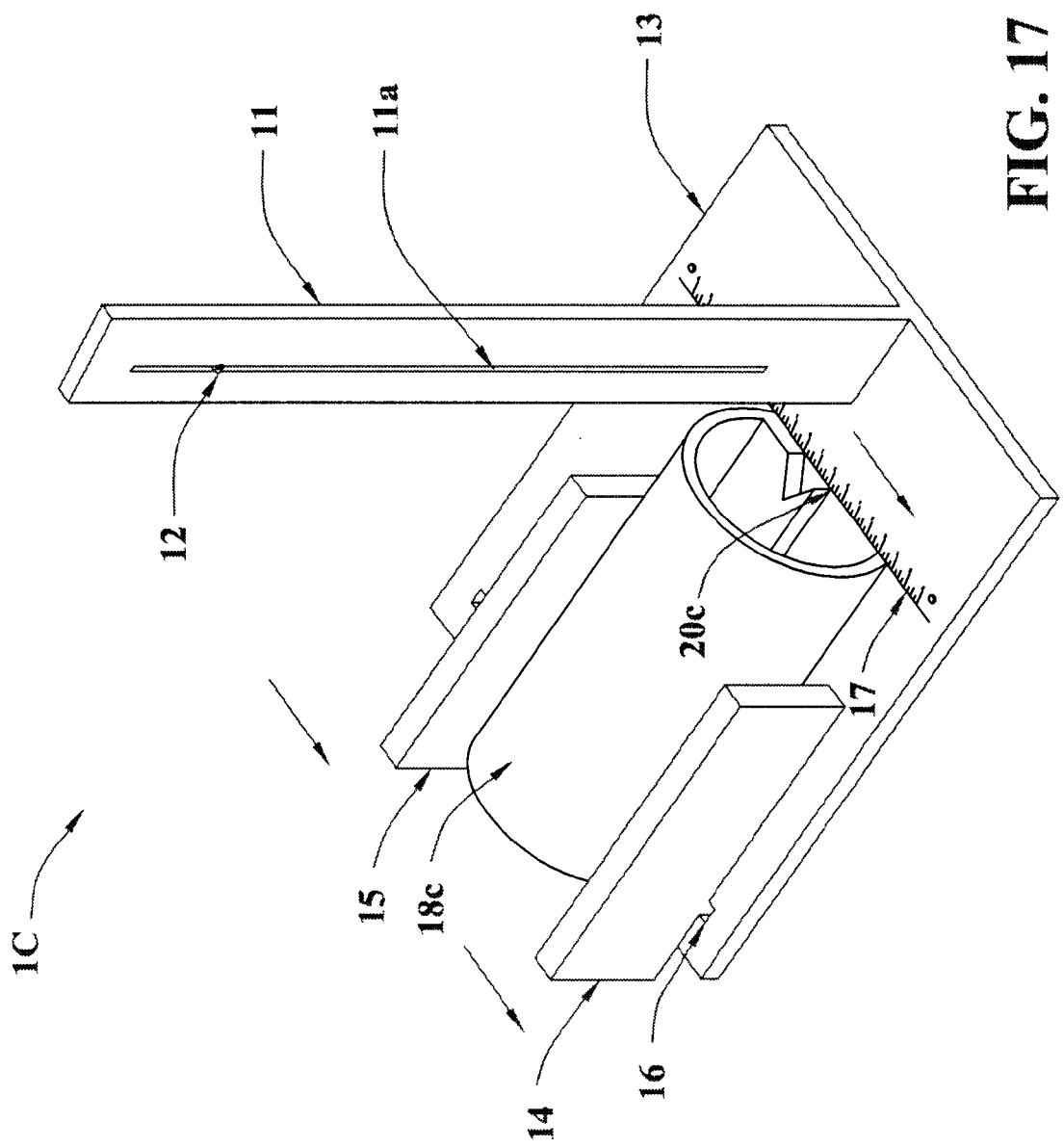

FIG. 17 shows an isometric view of the miter table 1C with a curved plate placed on the flat top of the table and the guides are moved so that the curved plate is positioned at a specific offset reading.

Figure 18:
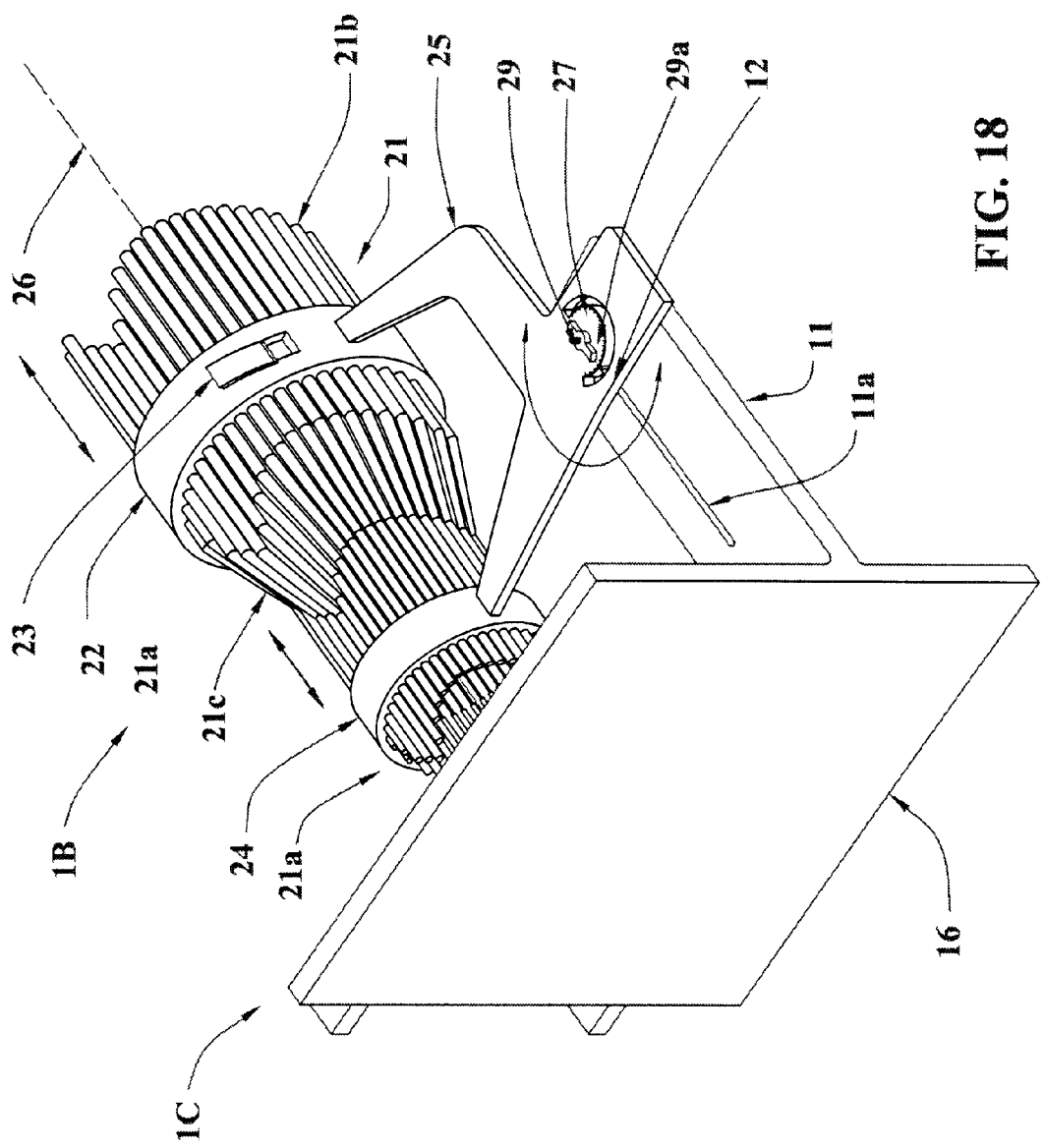

FIG. 18 shows an isometric view of the template adapter 1B attached to the miter table 1C with an alternative design of the rigid handle that allows for wide rotation of the template adapter 1B to record sharp miter angles without interference with the column of the miter table 1C.

Figure 19:
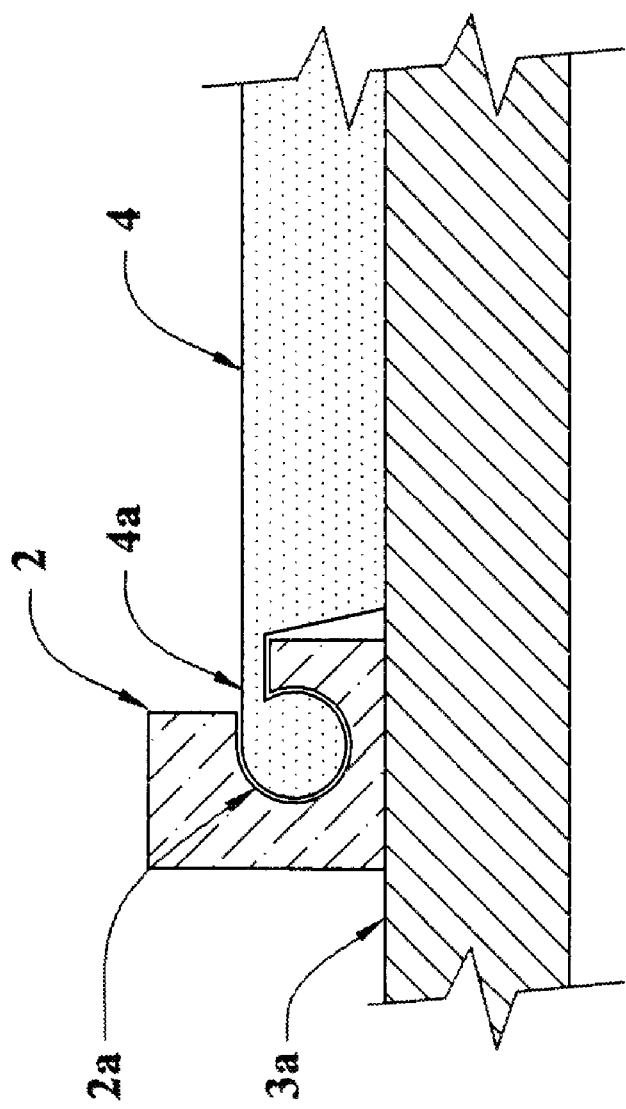

FIG. 19 shows a partial sectional view of the flexible track 2 as it interconnects to the end 4a of a sliding pin 4 inside the longitudinal slotted groove 2a of the flexible track 2, adjacent cylindrical stationary sleeve 3.

Figure 20:
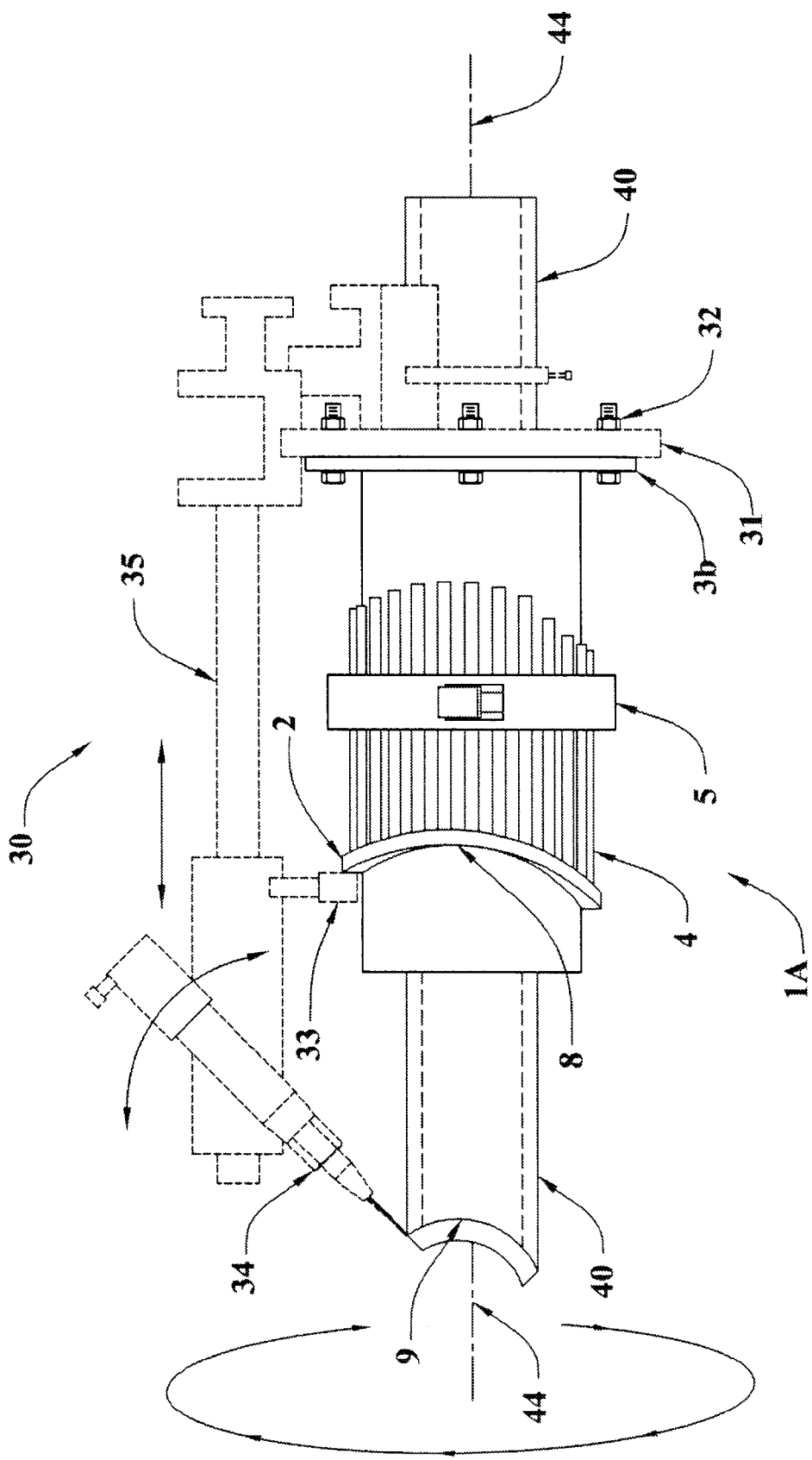

FIG. 20 shows a side view of the universal template 1A in use with a pipe-beveling machine 30.

Figure 21:
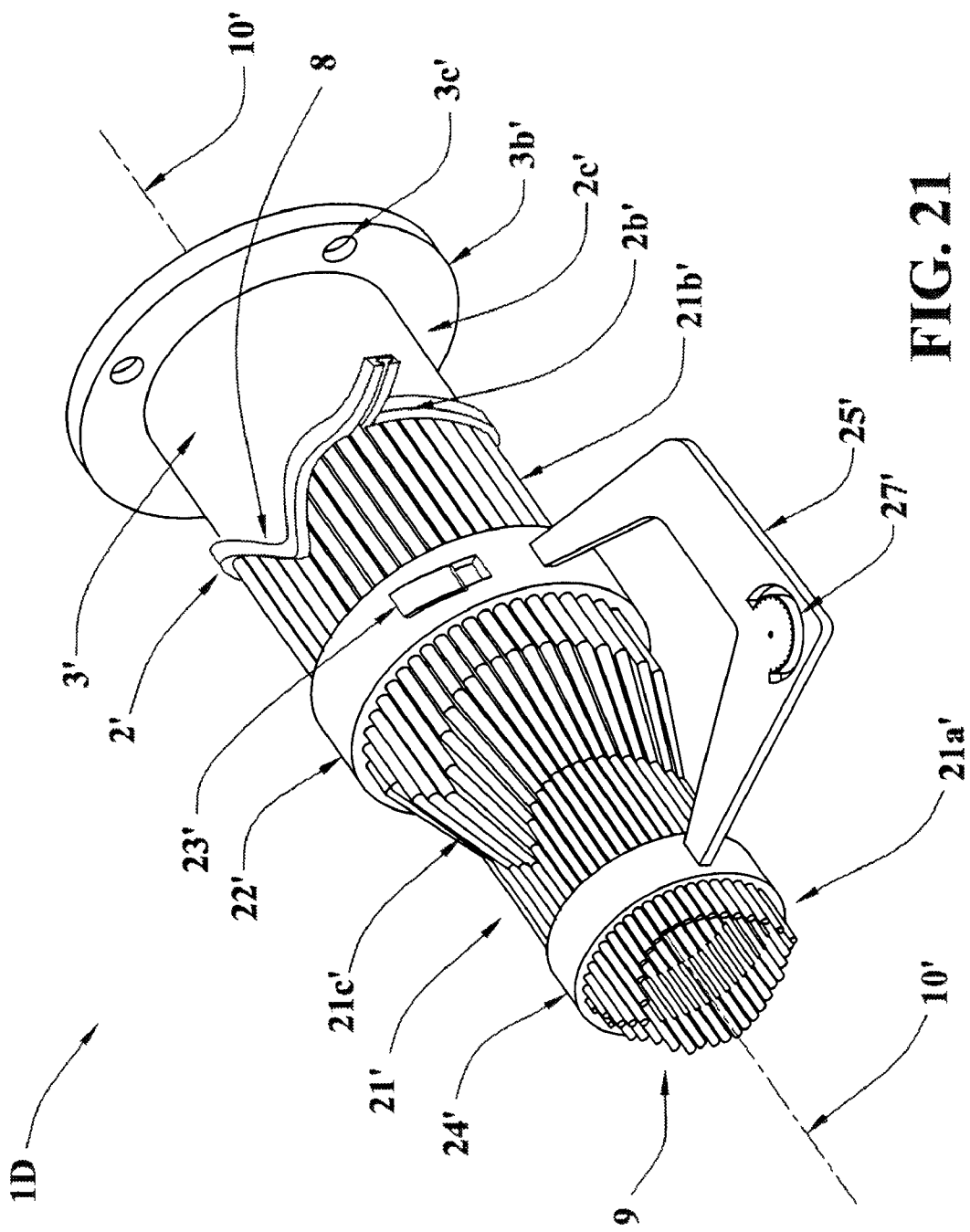

FIG. 21 shows an isometric view of an alternative embodiment of the universal template 1D.

Figure 22:
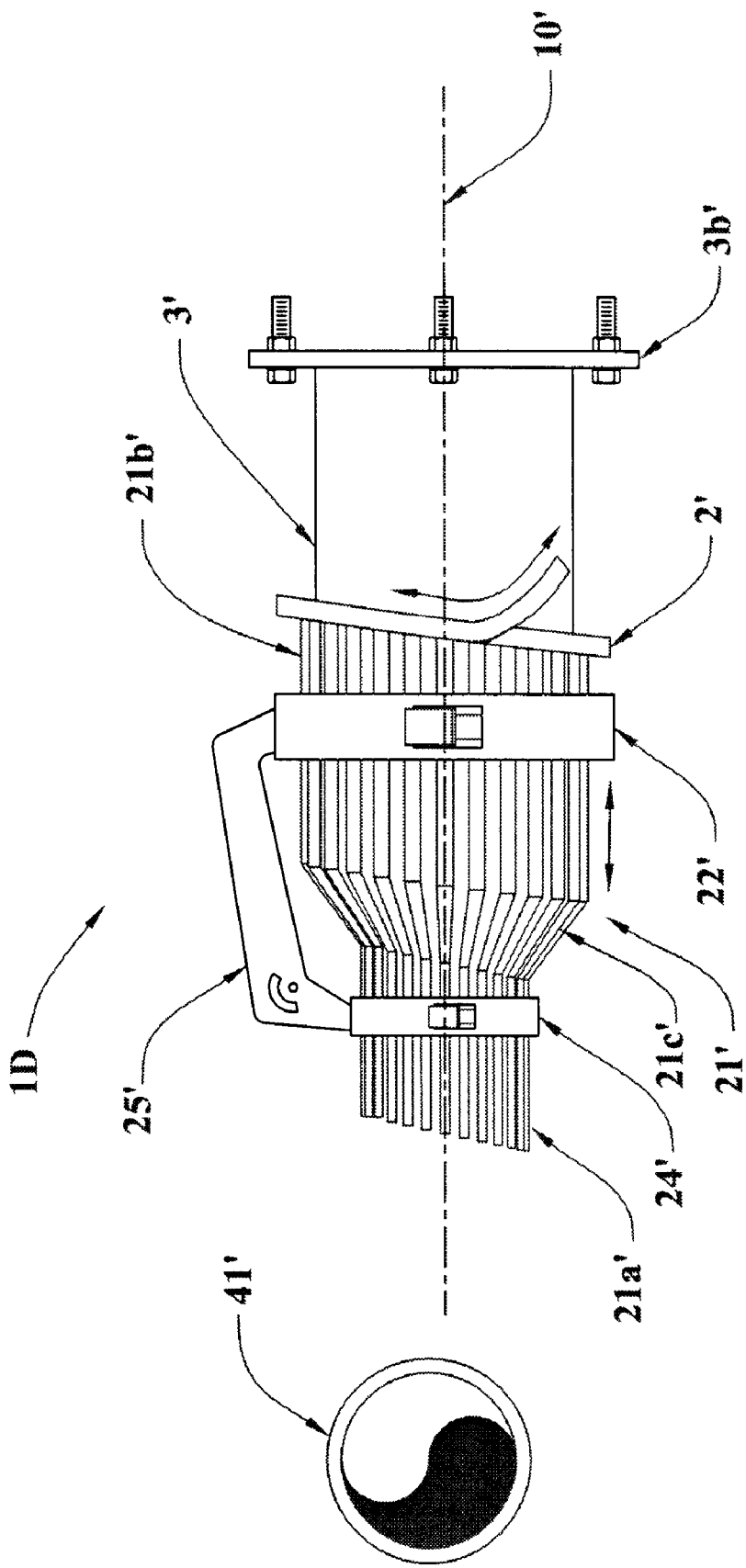

FIG. 22 shows a side view of the universal template 1D with the track on the end of the pins.

Figure 23:
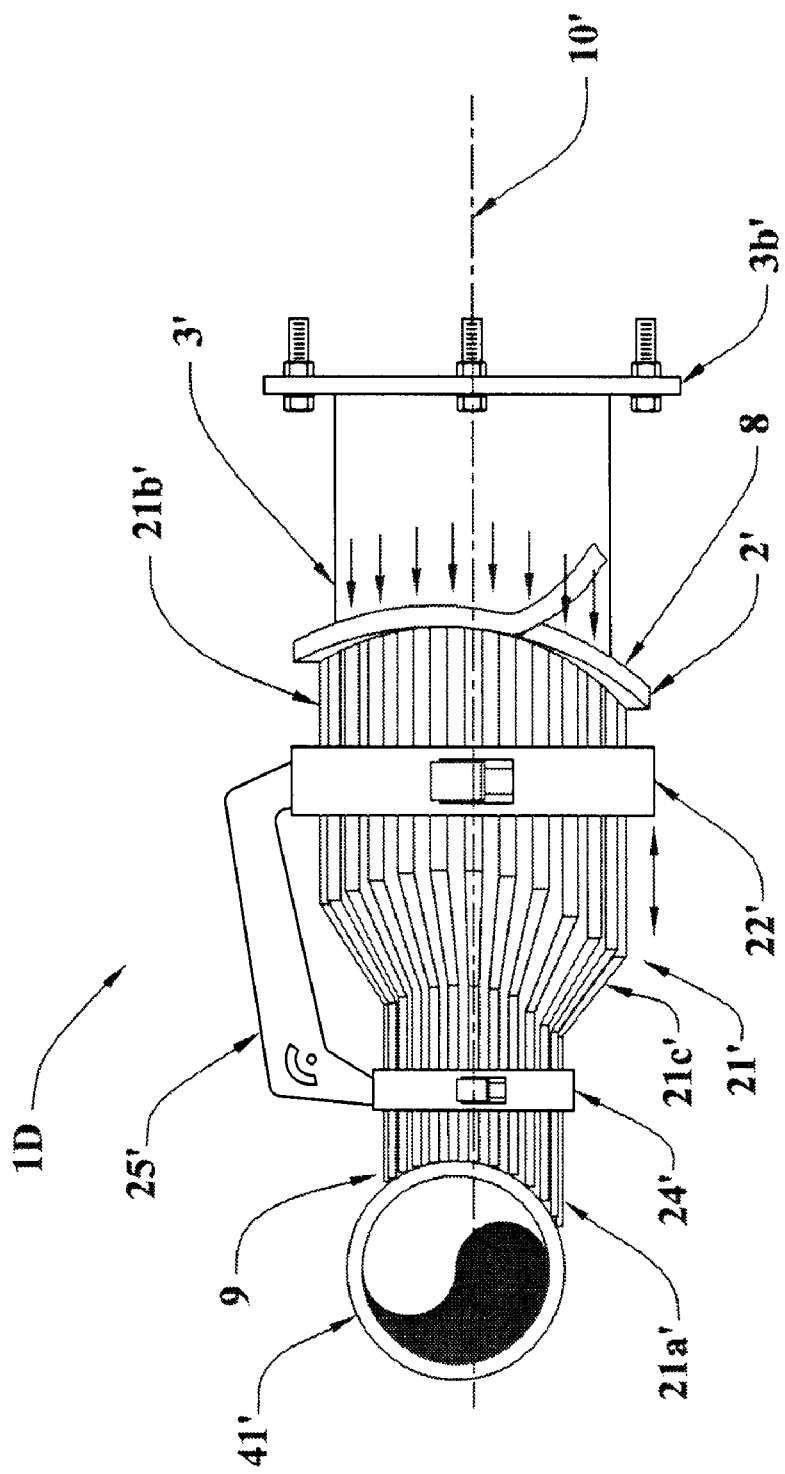

FIG. 23 shows a side view of the universal template 1D with the pins of the universal template engaging a pipe to obtain a contour for the track.

Figure 24:
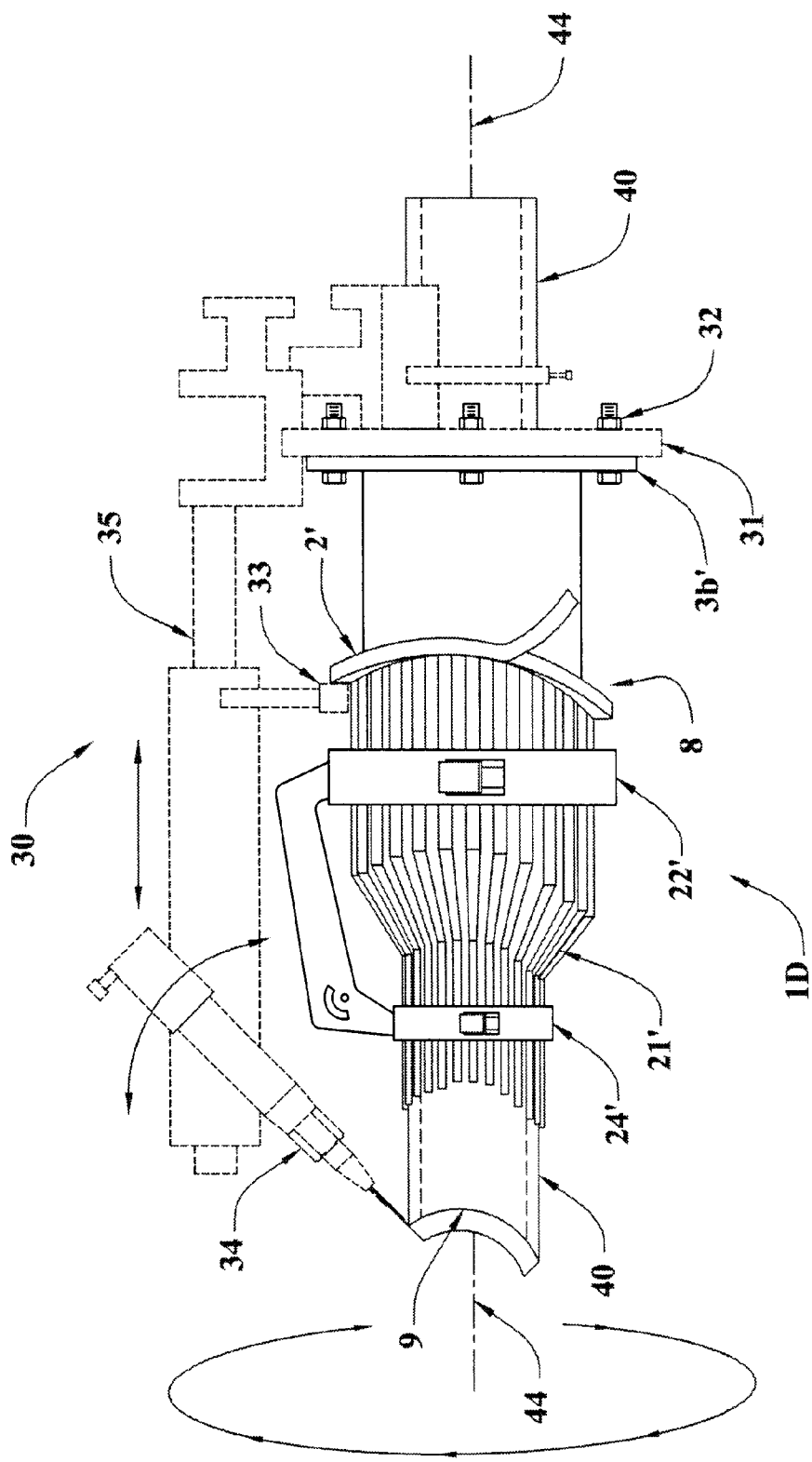

FIG. 24 shows a side view of the universal template 1D with the track on the end of the pins engaging a beveling machine.

Figure 25:
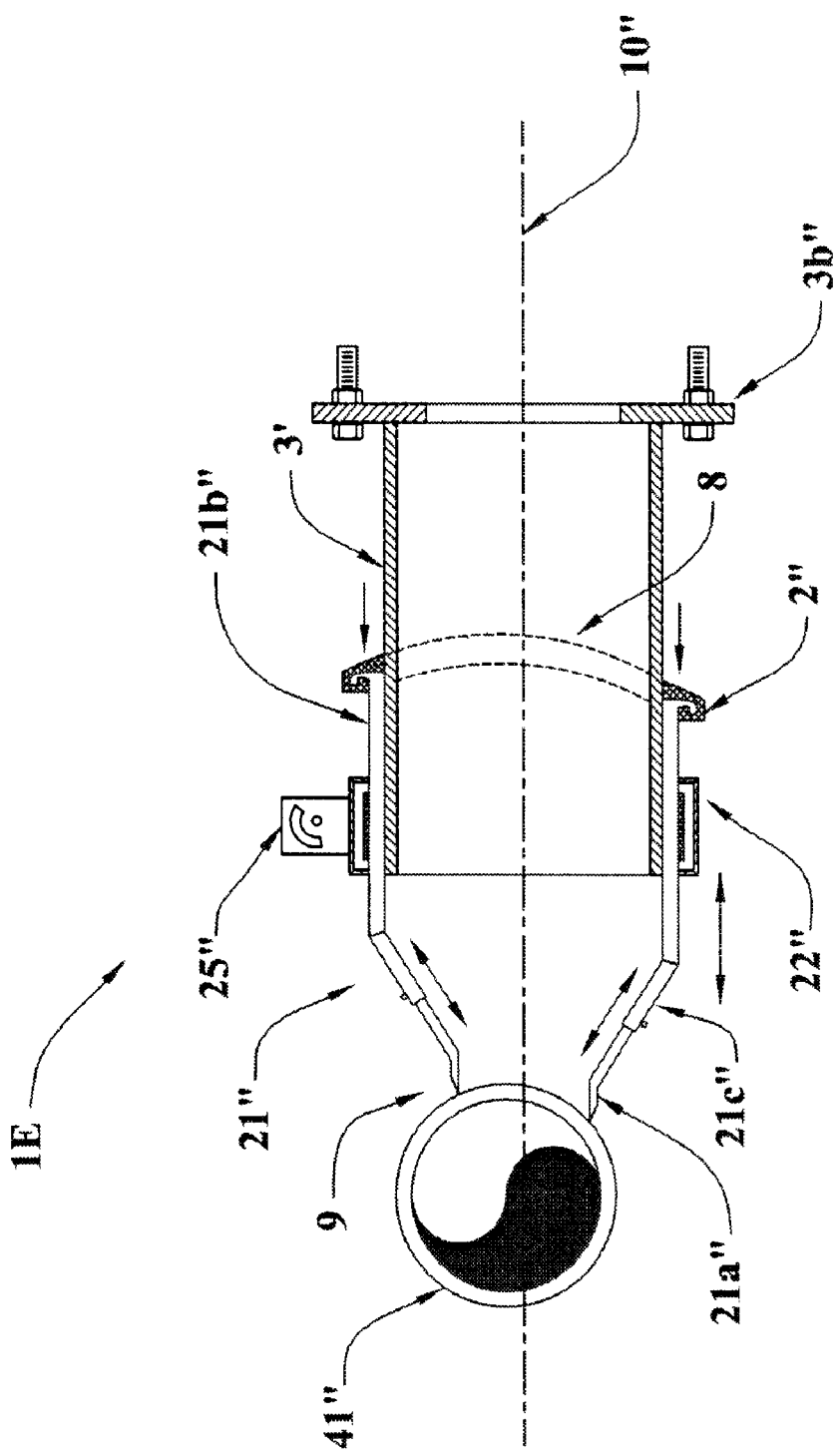

FIG. 25 shows a sectional side view of an alternative embodiment of the universal template 1E with adjustable segmented telescoping portions to adjust to several diameters of pipes.

Figure 26:
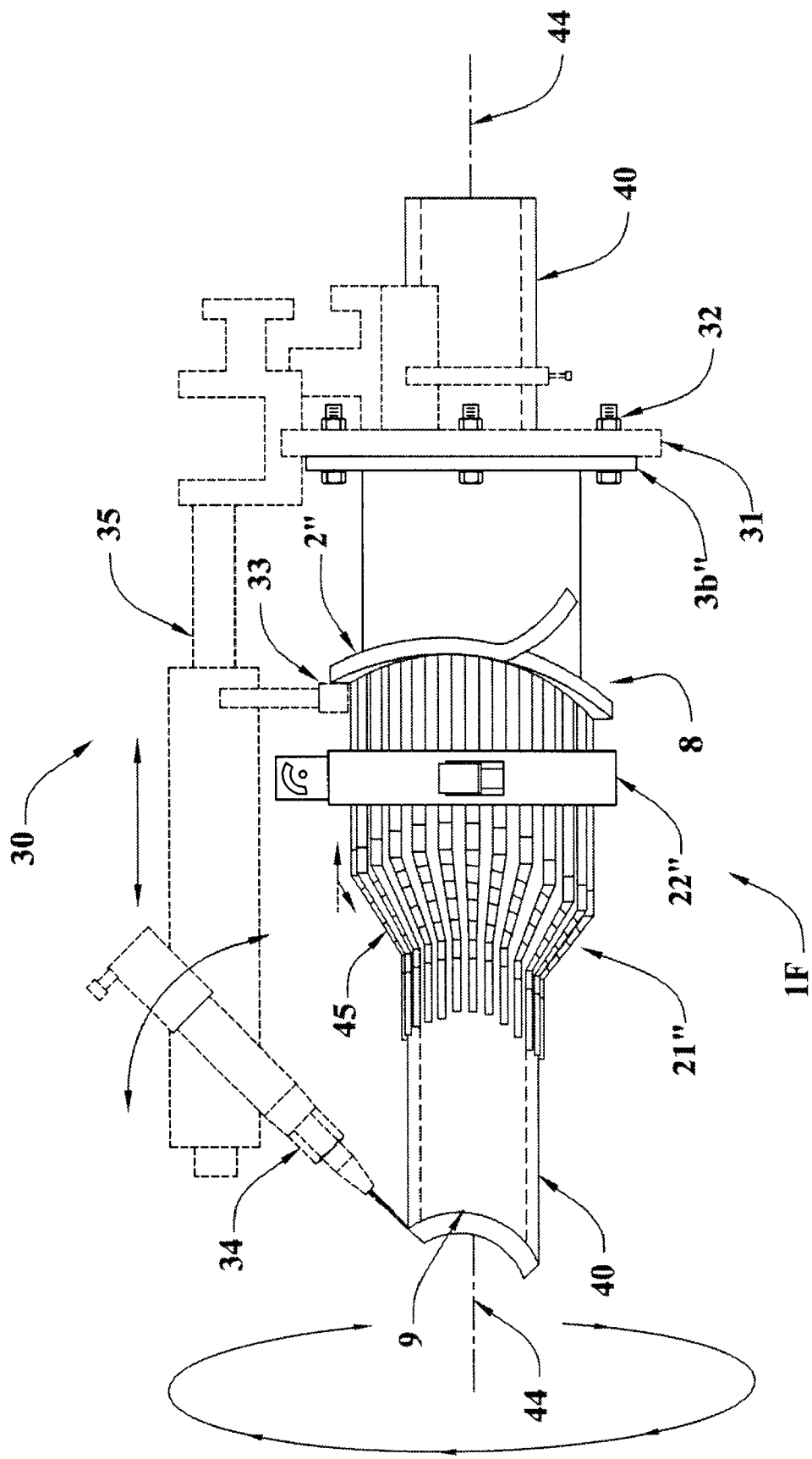

FIG. 26 shows a side view of an alternative embodiment of the universal template 1F with adjustable segmented angled portions to adjust to several diameters of pipes in use with a pipe-beveling machine 30.

Figure 27:
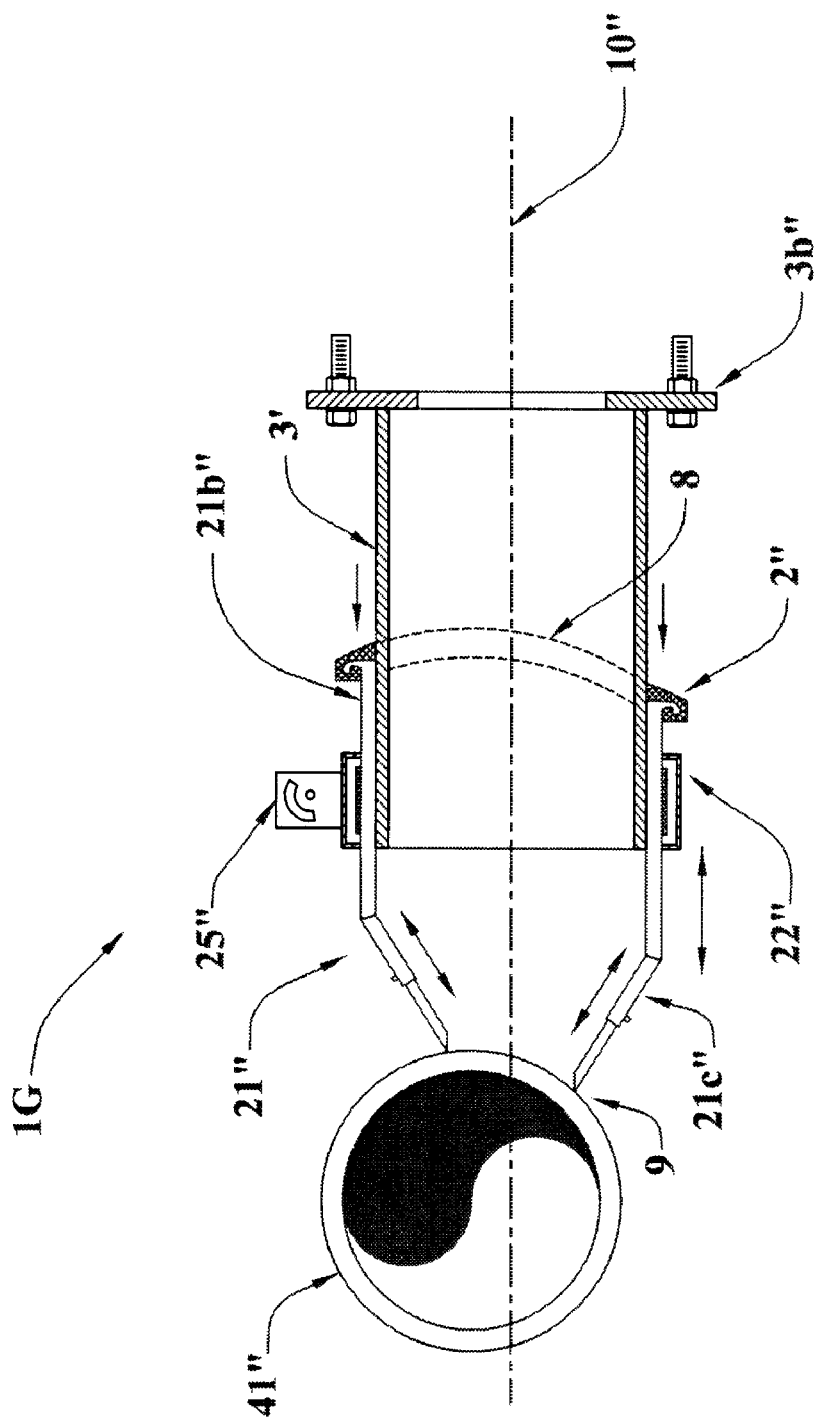

FIG. 27 shows a sectional side view of an alternative embodiment of the universal template 1G with adjustable telescoping angled portions to adjust to several diameters of pipes.

Figure 28:
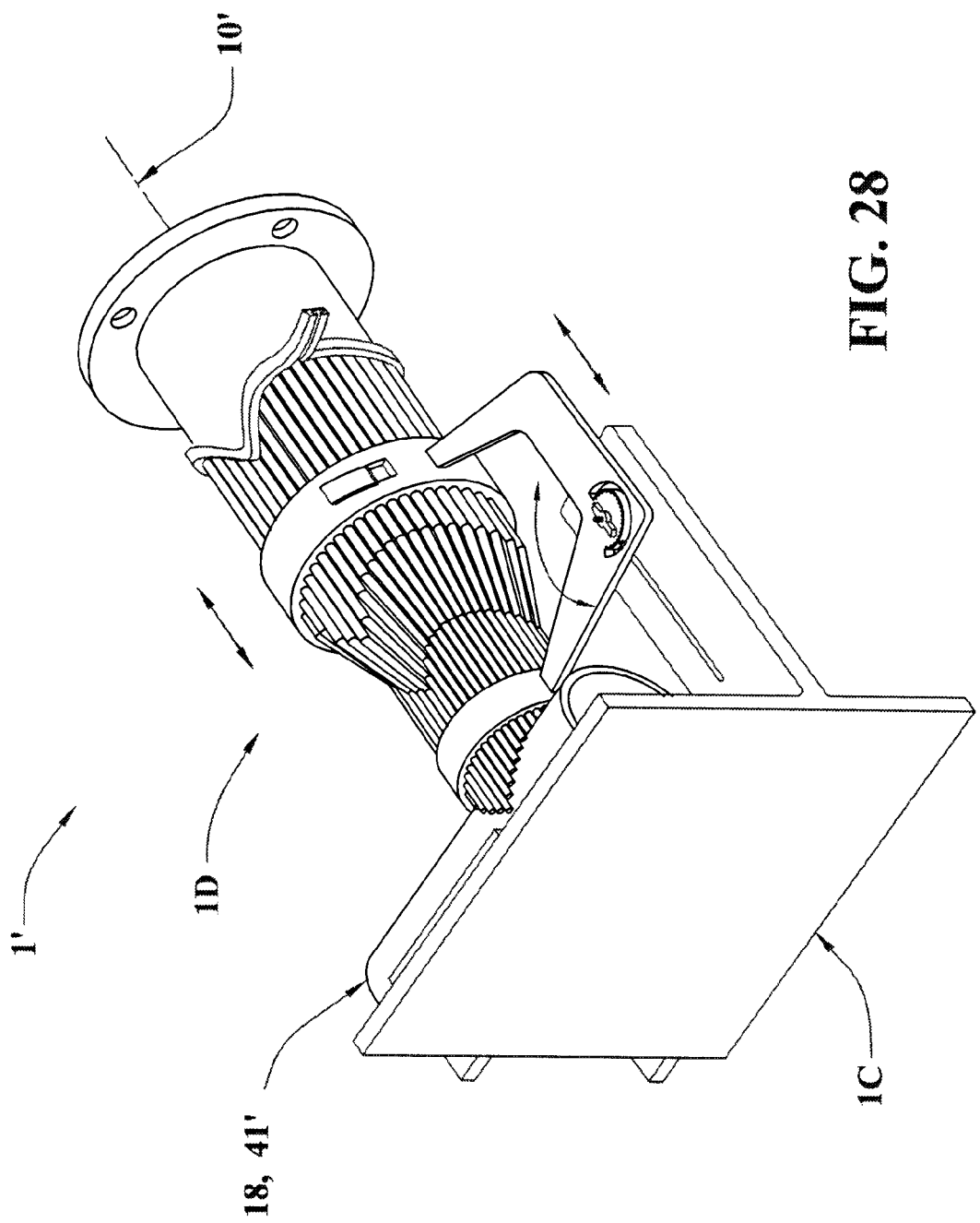

FIG. 28 shows an isometric view of the universal template 1D with the track on the end of the pins of the universal template 1D and a miter table attached.

DETAILED DESCRIPTION OF THE PREFERRED EMBODIMENT

Figure 1:
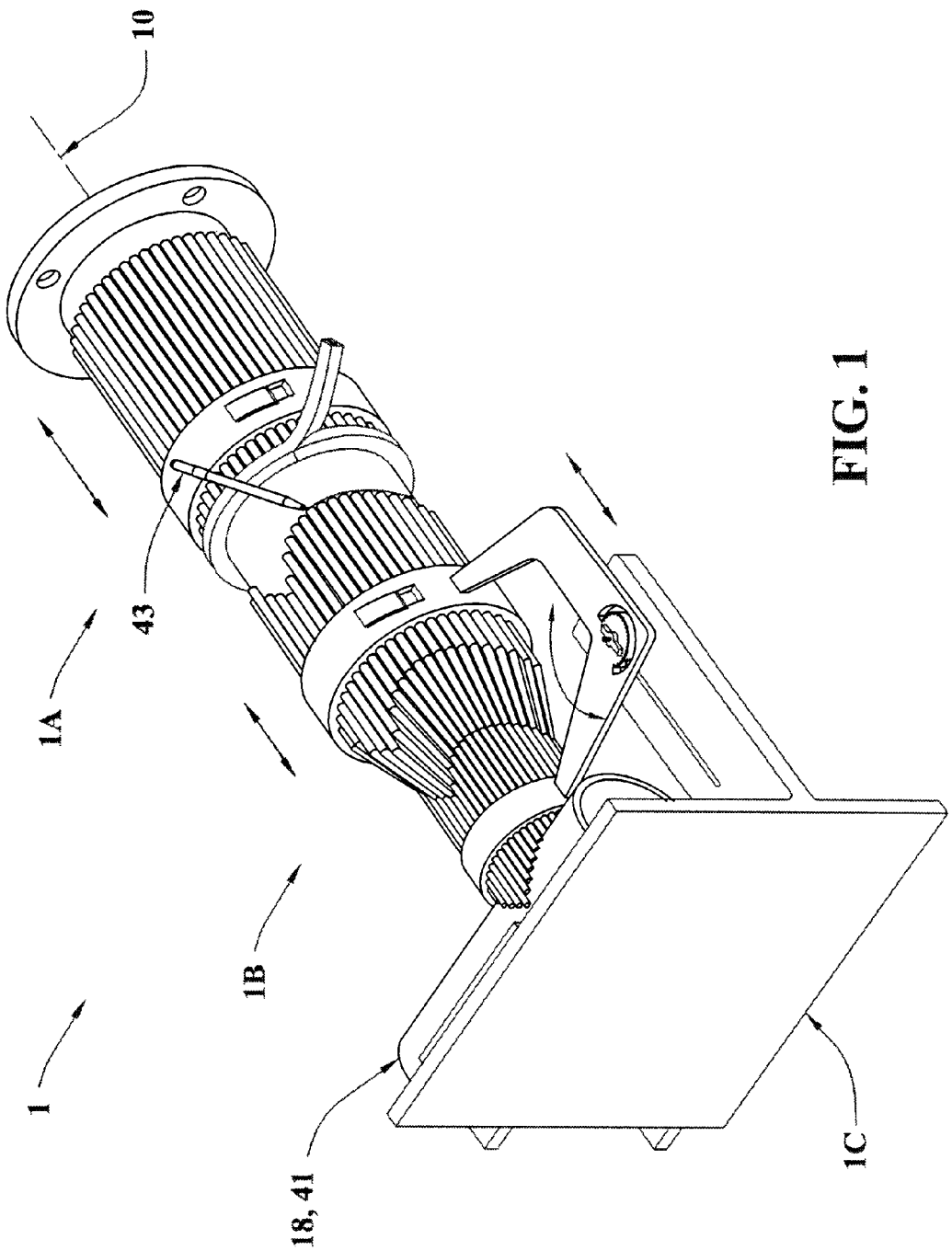
FIG. 1 shows an isometric view of the universal template 1A interconnected to the template adapter 1B and the miter table 1C. The system is use on a receiving component 41, being positioned on the miter table 1C and the track template being marked onto the universal template 1A using a marker 43.
Figure 2:
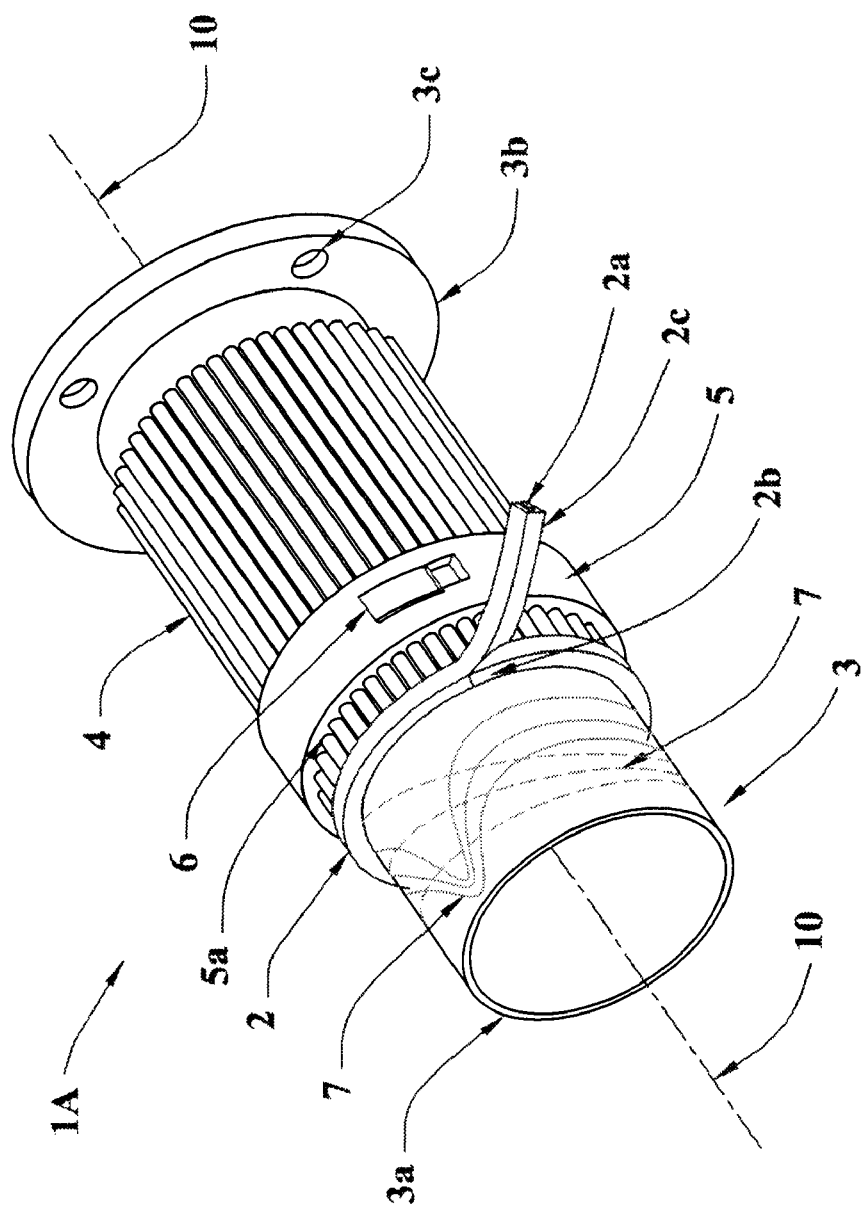
FIG. 2 shows an isometric view of the universal template 1A.
Figure 3:
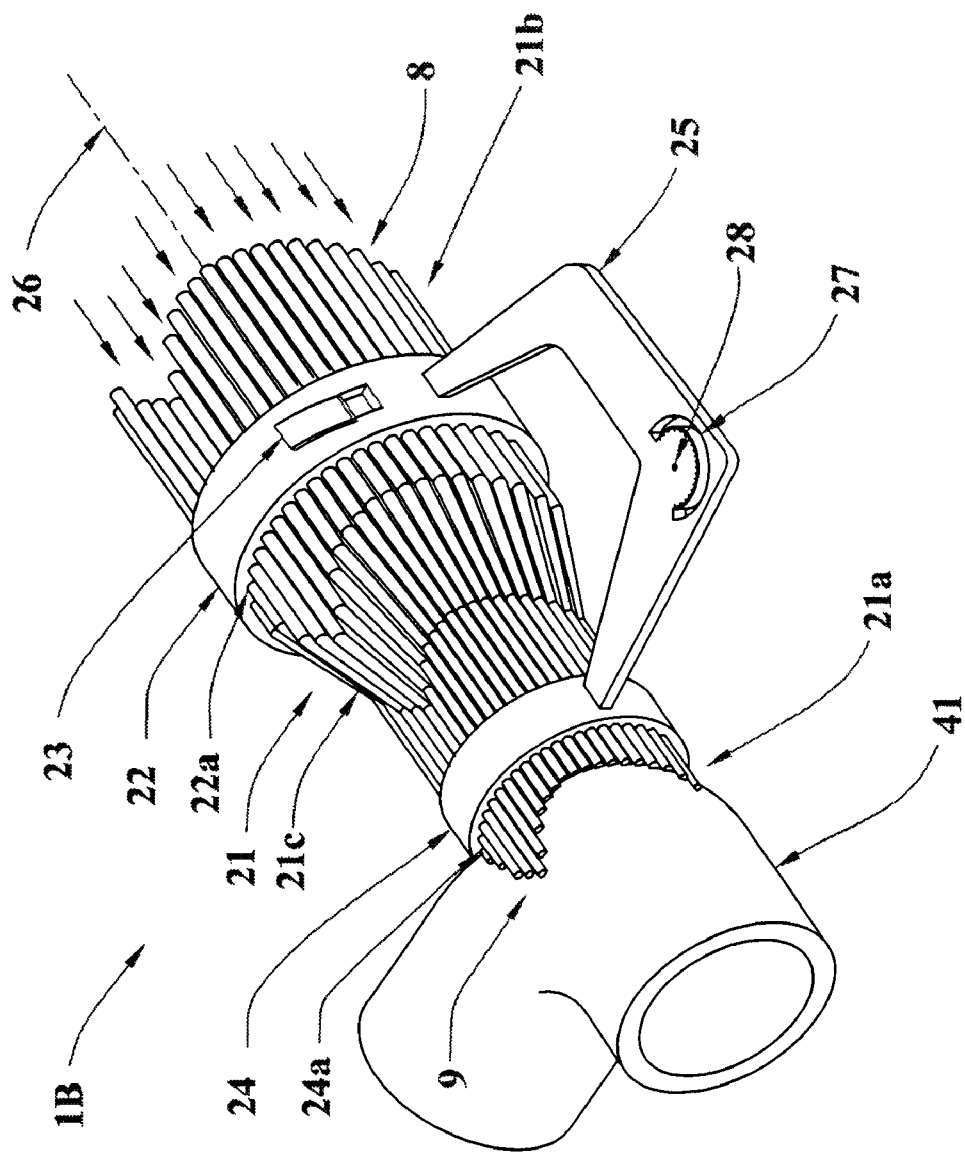
FIG. 3 shows an isometric view of the template adapter 1B pushed against a receiving component.
Figure 4:
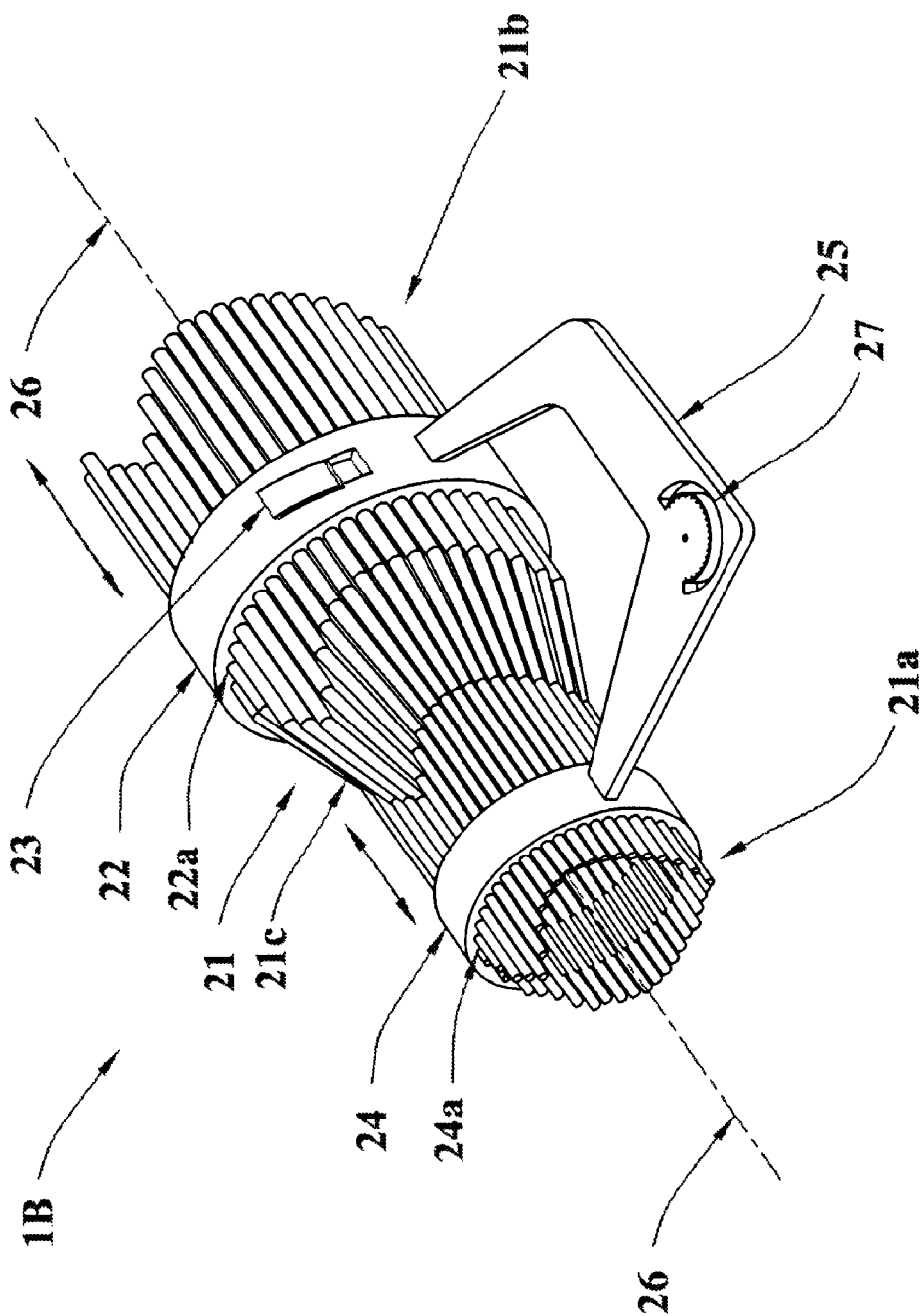
FIG. 4 shows an isometric view of the template adapter 1B.
Figure 5:
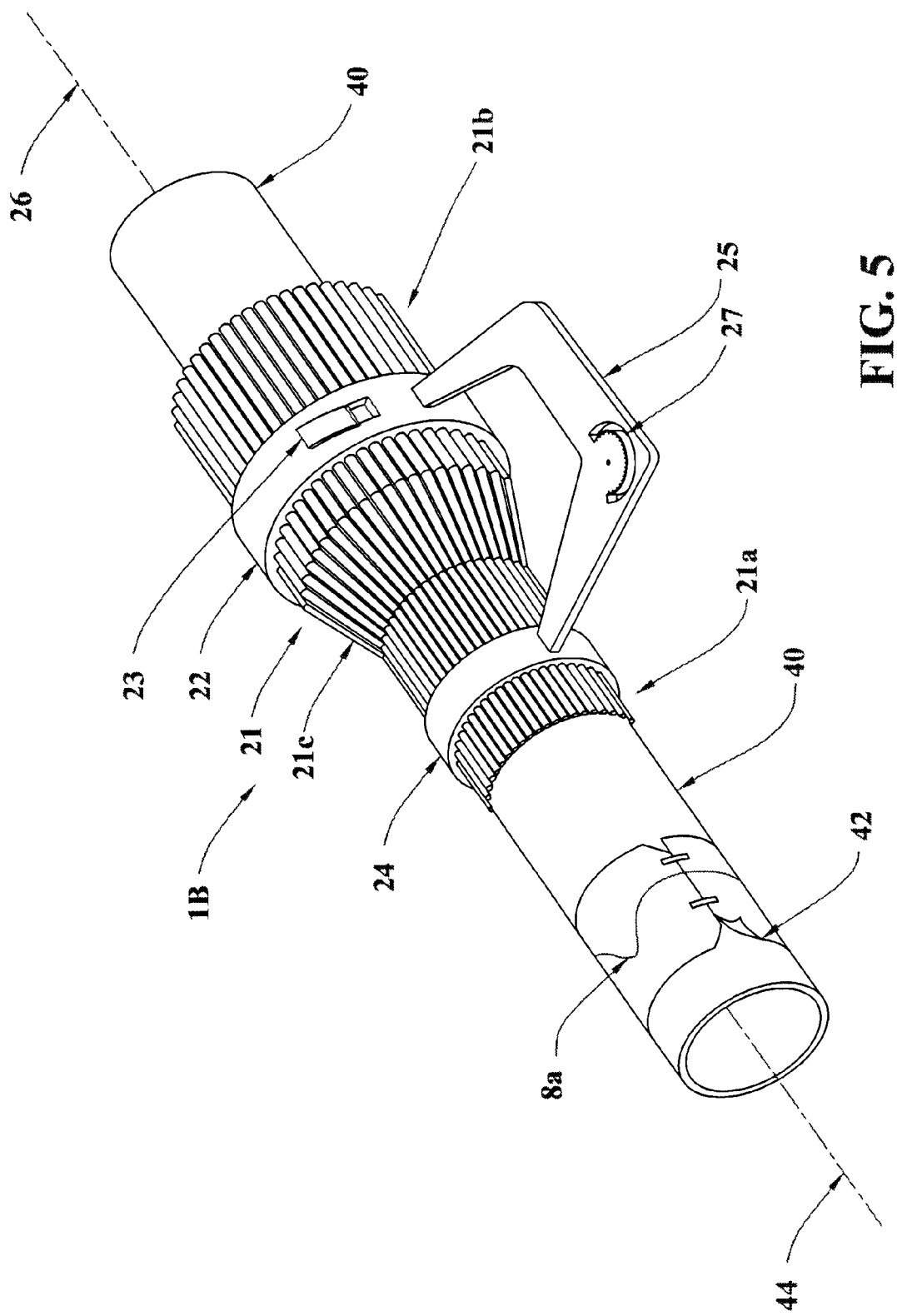
FIG. 5 shows an isometric view of the universal template 1A slipped over a pipe with a paper template wrapped around the pipe.
Figure 6:
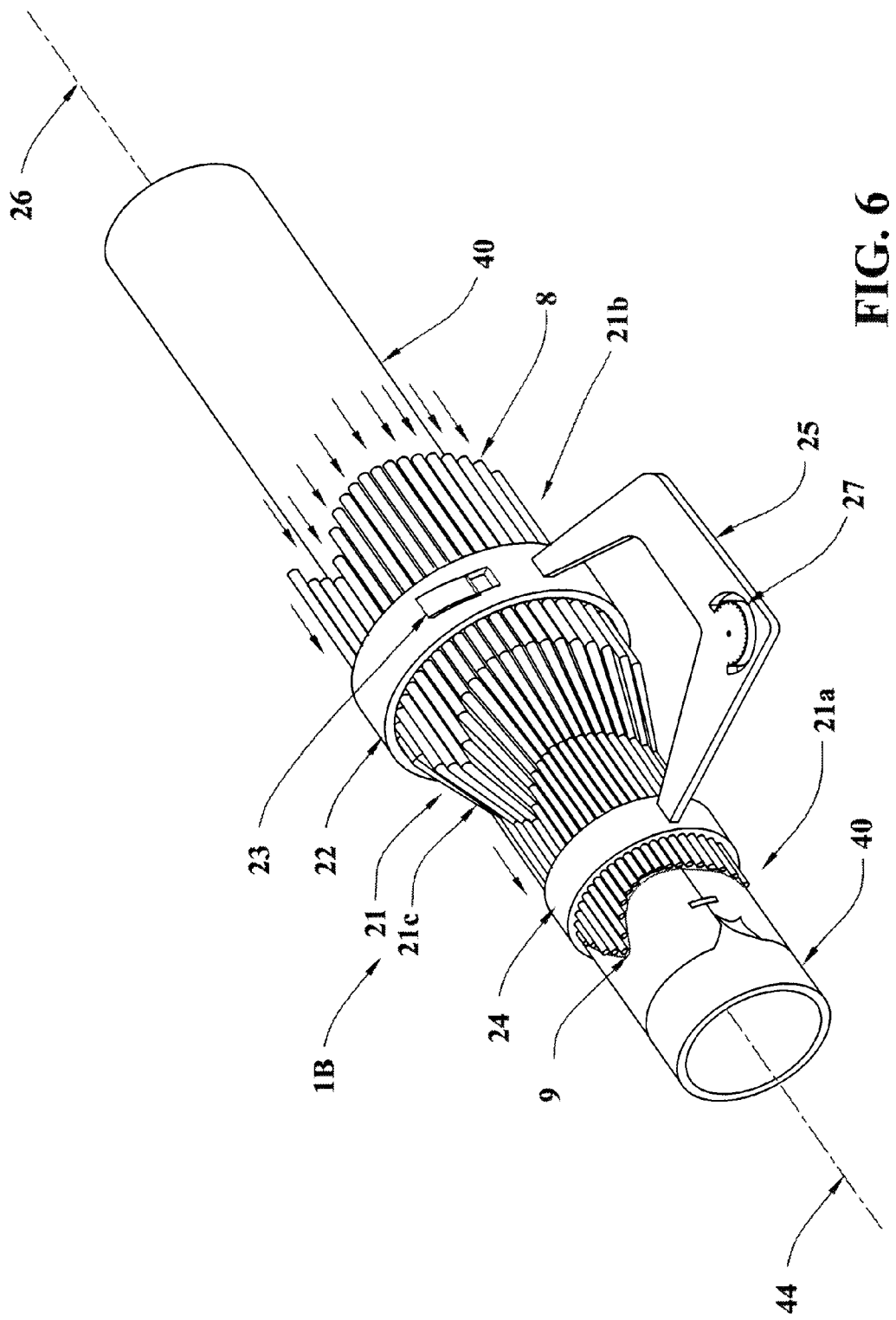
FIG. 6 shows an isometric view of the universal template 1A with its narrow end formed to take the shape of the pattern on the paper template. The template adapter 1B fixes the pins in place and creates the connection template 9 and the track template 8 for fabricating the connection.
Figure 7:
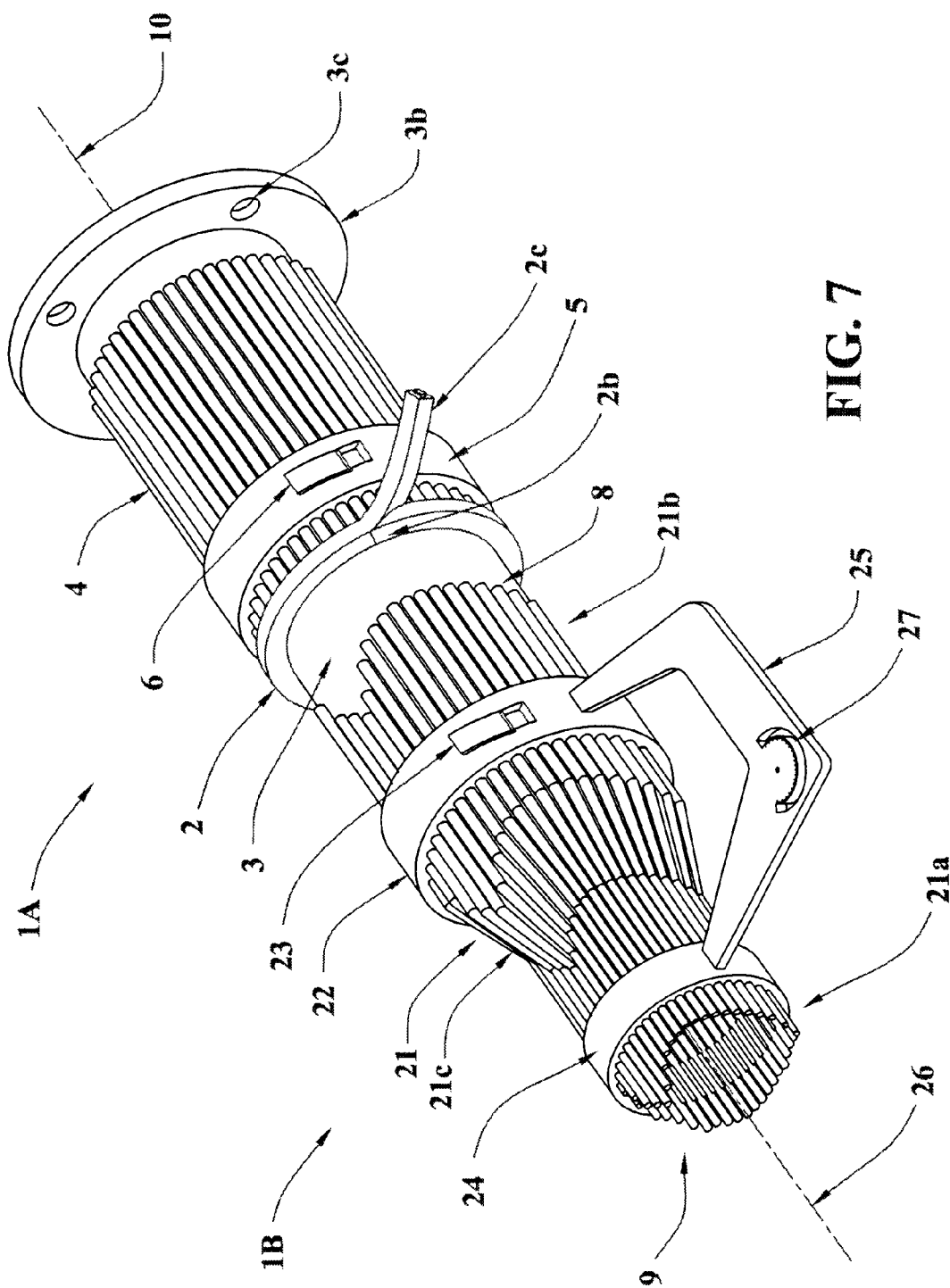
FIG. 7 shows an isometric view of the template adapter 1B slipped over the universal template 1A.
Figure 8:
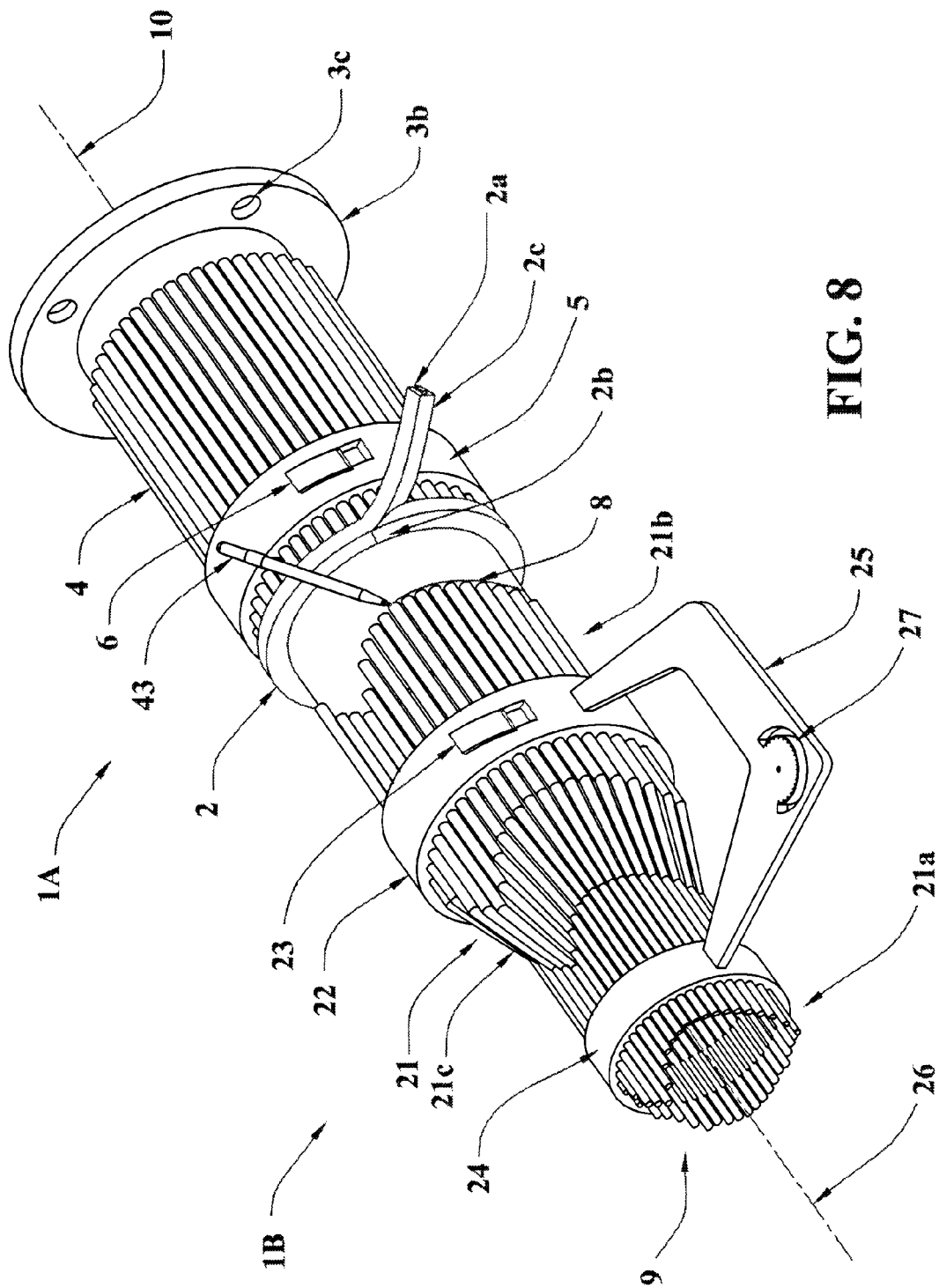
FIG. 8 shows the isometric view of FIG. 7 with the shape of the track template being transferred and marked onto the surface of the cylindrical stationary sleeve.
Figure 9:
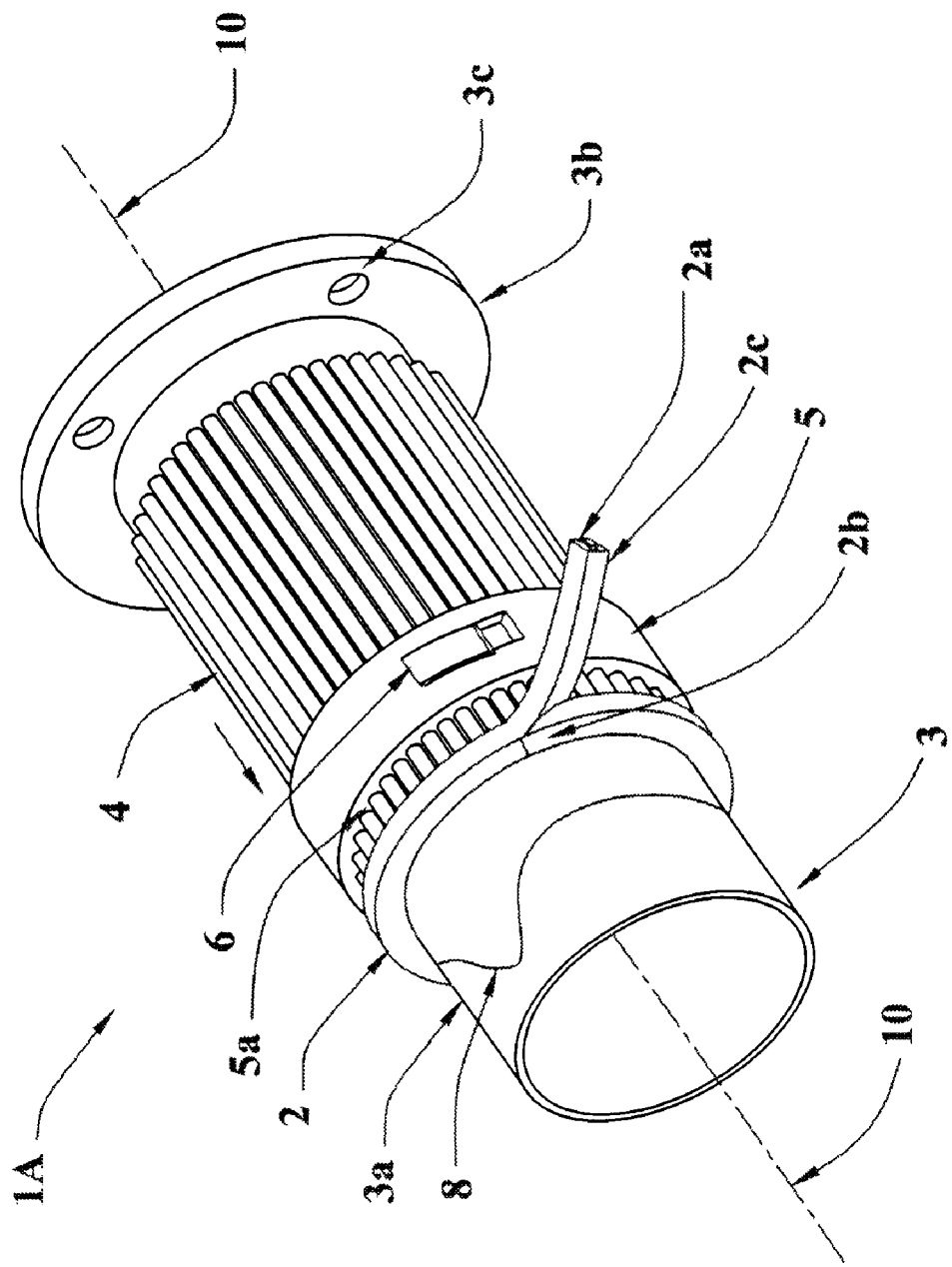
FIG. 9 shows an isometric view of the universal template 1A after the track template is fully marked onto the surface of the cylindrical stationary sleeve.
Figure 10:
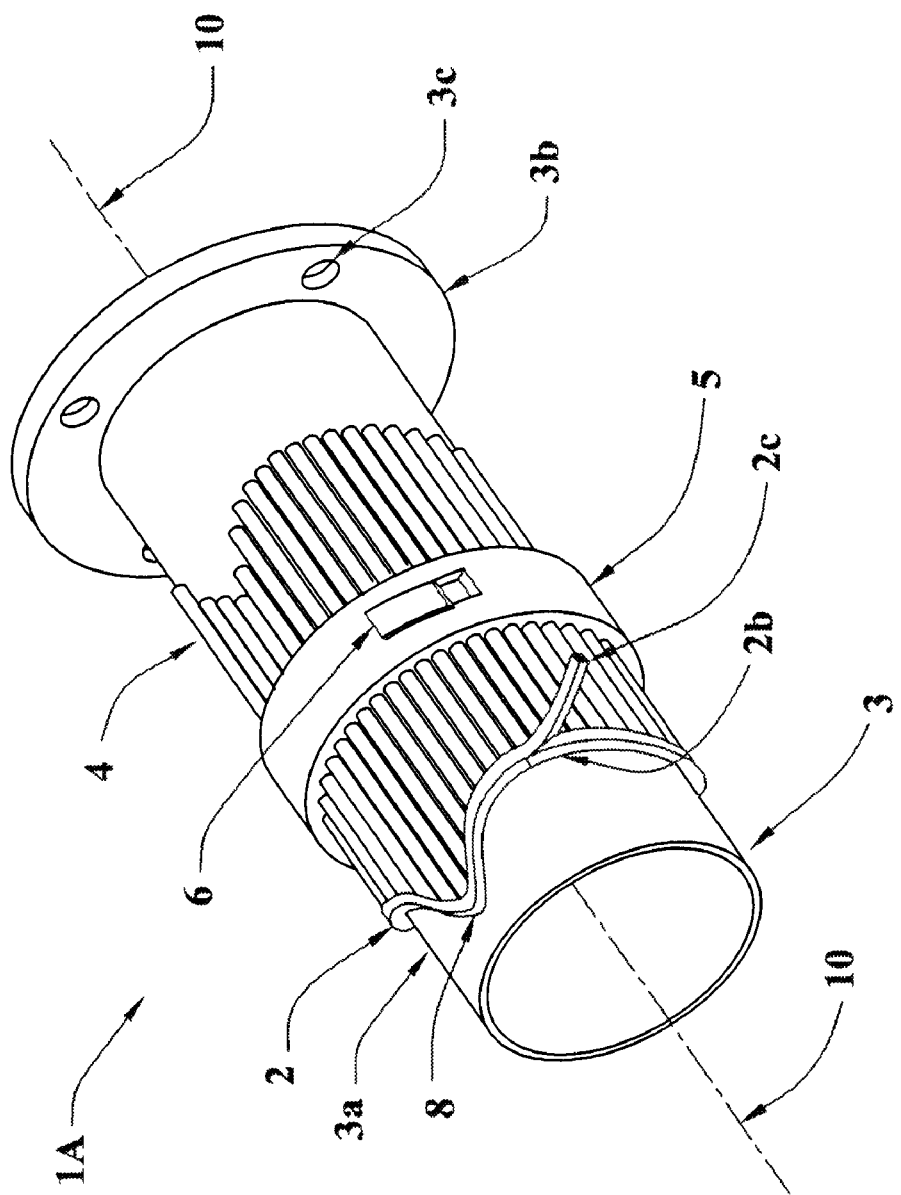
FIG. 10 shows an isometric view of the universal template 1A in FIG. 9 after the flexible track is formed to take the shape of the track template 8 marked onto the surface of the cylindrical stationary sleeve.
Figure 11:
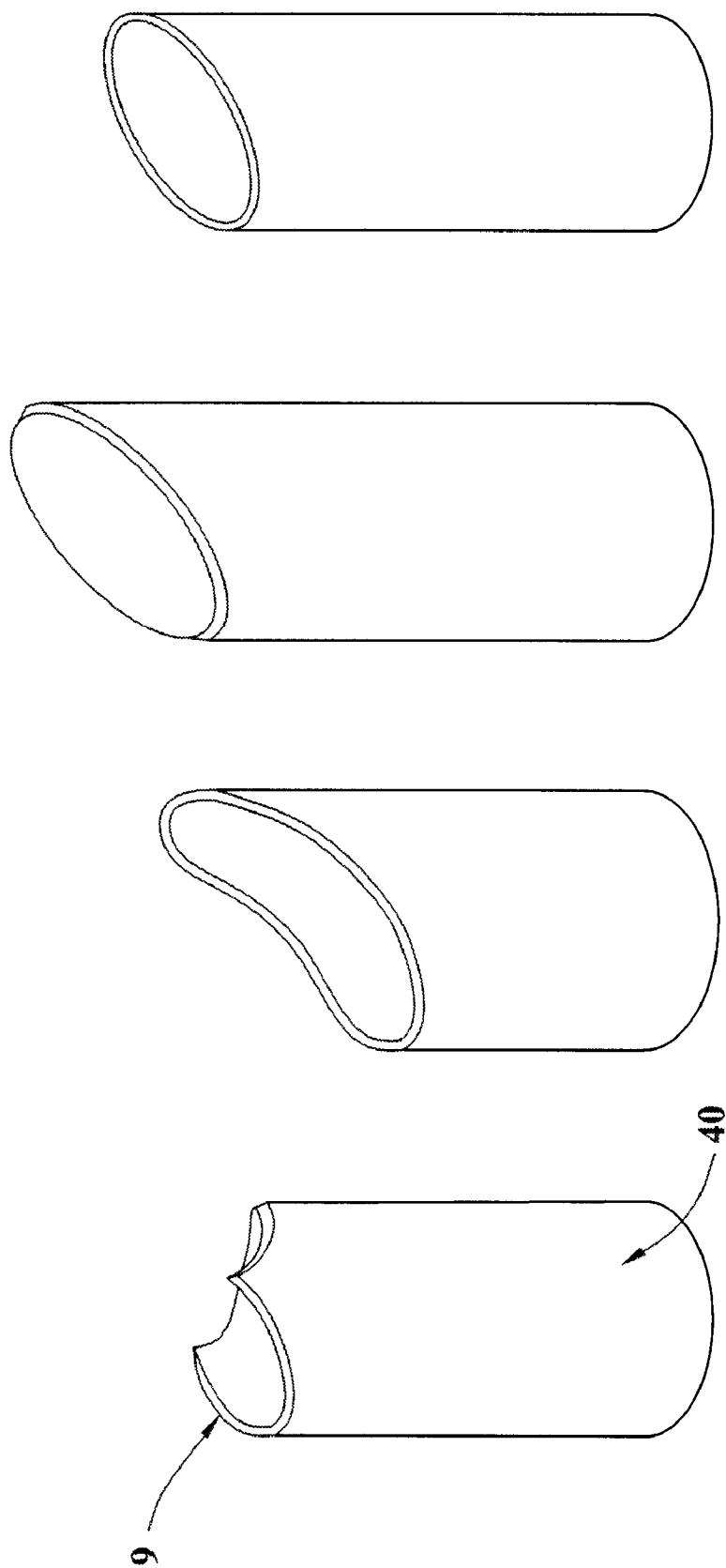
FIG. 11 shows an isometric view that illustrates some of the shape-cutting capabilities of the proposed invention.
Figure 12:
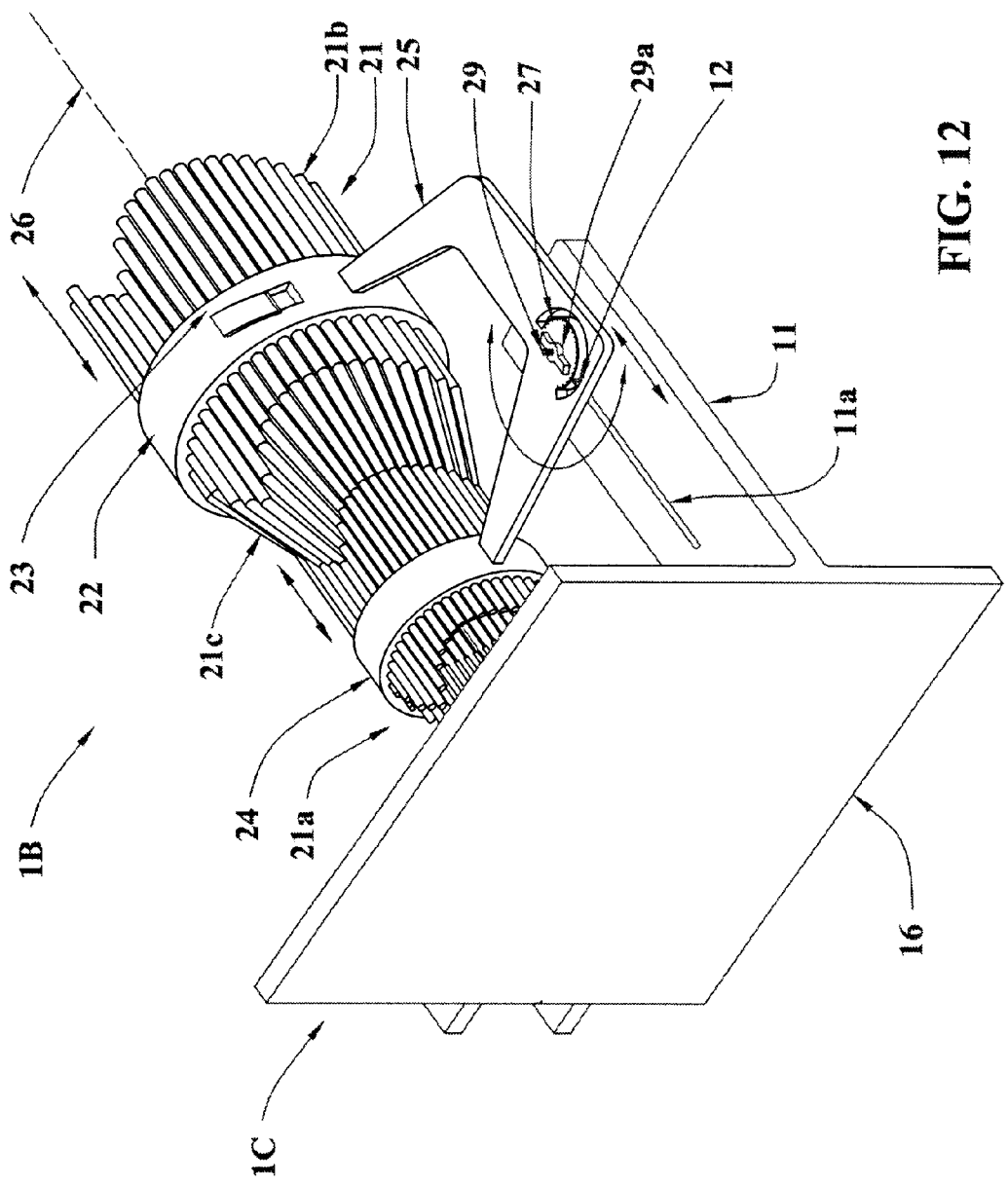
FIG. 12 shows an isometric view of the template adapter 1B attached to the miter table 1C showing possible relative motion and rotation.

The present invention relates to an accurate easy to use, and a cost-effective system for pipe end universal shape cutting, beveling and welding. The universal template 1 can be used with a short saddle pipe-beveling machine 30 as in FIG. 20. The universal template 1 can also work with a band-type cutting and beveling machine, if the machine is equipped with a face or bolting brackets. Such machines are well known and are generally available in the market. The main function of this apparatus is to allow a cutting torch 34 of a pipe saddle machine 30 to follow the path of the flexible track 2 while the machine rotates around the pipe 40, cutting and beveling a pipe end for a desired smooth shape cut. The use of a flexible track, in a beveling machine, yields accurate smooth cutting and uniform beveling. The universal template 1, used with a pipe-beveling machine, provides a method for automation and repetitive application of pipe shape cutting. The flexible track 2 of the universal template 1A, 1D, 1E, 1F, 1G can also be used for welding marking cutting or other functions. The flexible track 2, 2' and 2" of the universal template 1A, 1D, 1E, 1F, 1G is formed around the outer surface of a cylindrical stationary sleeve 3 to act as a three-dimensional template. After the flexible track 2, 2', 2" is formed to take the shape of the desired track template 8, a securing mechanism is used to hold the pins in place. Such securing mechanisms are well known in the art. The securing mechanism comprises a full array of parallel sliding pins 4 that slide independently along the surface of the cylindrical stationary sleeve 3 and through an array of guides 5a. The guides 5a are built in a secondary sleeve referred to as the pin sleeve 5. As shown in FIGS. 2 and 19 the flexible track 2 has the flexibility to bend in two perpendicular planes (flexible rulers used in two-dimensional manual drafting can bend in one plane only). The flexible track 2 is made of flexible plastic or rubber (or other similar material) and has a longitudinal slotted groove 2a, where the ends of the sliding pins 4a are attached. As the length of the track template 8 varies from one template to another, the slotted groove 2a allows the flexible track 2 to slide along the ends of the sliding pins 4a, making the length in use of the track adjustable. Small rollers may be installed at each pin end, or lubricants used, to allow for smooth track length adjustment. One end of the flexible track 2 is fixed to one of the sliding pins 4, while the other end will be free allowing for adjustability of the track length in-use. As shown in FIG. 2 the fixed end 2b of the flexible track 2 is tapered to create a smooth joint as it closes the loop with the free end 2c of the flexible track 2.

The cylindrical stationary sleeve 3 includes a hollow pipe 3a. The cylindrical stationary sleeve 3 is equipped with a flange 3b at one end. The flange 3b allows the universal template 1A to be mounted to the face 31 of a beveling machine 30 or other machines such as a welder or other cutting machines. The flange 3b is designed to have the same bolt hole pattern of the face 31 of a beveling machine 30 or to provide for means of attachment to the face 31 of a beveling machine 30, or other types of machines.

As shown in FIG. 19 the sliding pins 4 are attached at one end to the flexible track 2 and can be secured in place using a locking mechanism 6, built into the pin sleeve 5. Ends of the sliding pins 4a are shaped to fit inside and slide through the slotted groove 2a of the flexible track 2. The locking mechanism 6 employs a friction strap wrapped around the said pins. The friction strap is tightened or loosened, locking or releasing the pins 4 in place as needed.

As an alternative to using the sliding pins 4, the said locking mechanism may consist of a series of electrical magnets arranged along the flexible track 2 and activated to secure the flexible track 2 in place, while the said track is formed around the outer surface of the cylindrical stationary sleeve 3.

The pin sleeve 5 has a ring shape and is placed around to the cylindrical stationary sleeve 3. Several standard track templates 7 for different shape and miter cuts can be marked (or engraved) onto the outer surface of the cylindrical stationary sleeve 3. Each engraved template is given a designated name or code 7a. Standard template marks 7 can be color-coded in order to be distinguished. A user guide is used to illustrate standard connections or miters corresponding to engraved codes.

In one embodiment the process of using the universal template 1A for beveled shape- cutting of a pipe end includes the following steps:

(A.1) Attach the universal template 1 at the flange 3b to the face 31 of a beveling machine 30 using a set of bolts 32 or the like.

(A.2) Slightly tighten the locking mechanism 6 to allow for forced-only sliding of the sliding pins 4.

(A.3) Form the flexible track, around the cylindrical stationary sleeve 3 by aligning the outer edge of the track with the desired engraved template mark 7, or a desired track template 8 marked on the stationary sleeve 3. Visually insure that perfect alignment of the track and the template is achieved.

(A.4) Once the alignment is achieved, firmly tighten the locking mechanism 7 to secure the flexible track in place.

(A.5) Engage the torch roller 33 of a short saddle machine 20 with the outer edge of the flexible track 2.

(A.6) With the torch 34 ignited, and beveling angle adjusted, rotate the torch arm mechanism 35 using manual or mechanical devices.

(A.7) As the torch arm mechanism 35 rotates, the spring tension exerted on the torch roller 33 causes the roller 33 to follow the shaped edge of the flexible track 2, cutting and beveling the pipe 40 (work piece) to the desired shape. The locking mechanism 7 prevents the pins and the track from moving under the spring tension exerted on the torch roller 33.

In order to cut a pipe end to the shape of a connection template 9, the cutting torch needs to follow the corresponding track template 8. The diameter of the track template 8 falls within the reach of torch roller 33 and is usually greater than the diameter of the pipe 40 (work piece), that falls within the pipe diameter range of the beveling machine 30. The diameter of the track template 8 equals the diameter of the cylindrical stationary sleeve 3. In machines the track template requires having a diameter that is greater than that of the pipe being prepared. Thus, the unfolded shape of the track template 8 is derived from the unfolded shape of the pipe connection template 9 resulting from the geometry of intersection of the pipe 40 with a receiving component 41 such as another pipe or a large shell.

Another aspect of this invention relates to a tool and a direct method for generating the track template 8 required for facilitating contoured cuts using a beveling machine. The template adapter 1B, precisely generates track templates in a simple and direct manner that requires minimal skills. The template adapter 1B eliminates the need for using descriptive geometry methods used in prior art to derive guide templates. The template adapter 1B is made of a full array of Z-shaped pins 21 arranged radially to form the shape of a stepped cylinder. One side of the adapter 21*a* has a diameter approximately equal to the outer diameter of the pipe 40. The other side 21*b* has a diameter approximately equal to the stationary pipe sleeve 3 of the universal template 1. An angled portion 21*c* connects the two diameters 21*a* and 21*b*. The Z-shaped pins 21 slide independently through two adapter sleeves 22, 24 forming the shape of a stepped cylinder. The said sleeves 22, 24 are parallel to each other and have a common centerline 26. The first sleeve is located at the wide side 21*b* and is referred to as the adapter wide sleeve 22. The second sleeve is located at the narrow side 21*a* and is referred to as the adapter narrow sleeve 24. The pins 21 are received by two arrays of guides 22*a*, 24*a*. The guides are radially arranged and built in the adapter sleeves 22, 24. The guides 22*a* allow the pins 21 to slide longitudinally and restrain pins from rotation. The guides keep pins 21 parallel and maintain the shape of the stepped cylinder. One or at least one (or both) of the adapter wide sleeve 22 or the adapter narrow sleeve 24 is equipped with a locking mechanism 23 to lock the pins 21 in place when needed. The locking mechanism 23 employs a friction strap, wrapped around the pins 21. The friction strap is tightened or loosened, locking or releasing the pins 21 in place as needed. The main objective of the template adapter 1B is to record the connection template 9 (at the narrow end) and simultaneously generate the corresponding track template 8 (at the wide end). The track template is then transferred onto the universal template 1 and used for shape cutting.

The relative position of both adapter sleeves 22, 24 is maintained by a rigid handle 25. The U-shaped handle is fixed to both sleeves. The rigid handle 25 ensures that the Z-shaped pins 21 are always parallel to each other and to the adapter centerline 26.

The rigid handle 25 has a circular pivot hole 28. The pivot hole receives a threaded pin 29 with its matching wing nut 29*a*. As shown in FIG. 18 the function of the pivot hole 28 and the pin 29 is to attach the template adapter 1B to the miter table 1C. The rigid handle 25 has a C-shaped window with protractor gradations 27*a* engraved around the said window 27. The C-shaped window is circular, and its center coincides with the center of pivot hole 28.

The method of the template adapter 1B includes forming the narrow side 21*a* of the adapter to take the shape of the pipe connection template 9. As pins 21 slide along the adapter sleeve 22, the corresponding track template 8 is simultaneously generated at the wide side 21*b*. One way to carry out this process is to push the pins 21 to allow the narrow side 21*a* of the adapter to contact the surface of the receiving component 41, which will be joined to the work piece 40. The said process is carried out while both the adapter and the receiving component are at the desired predetermined relative orientation. As the narrow side 21*a* of the adapter records the connection template 9, the corresponding track template 8 is simultaneously generated at the wide side 21*b*. Another way is to use readily available and widely used paper templates in the following manner shown in FIGS. 5–10:

(a) A paper template 42 is wrapped around the work piece 40, and a template adapter 1B is slipped over the work piece 40.

(b) Then, the pins at the narrow side 21*a* are aligned with the template contour 42*a*, causing the wide side 21*b* to take the shape of the desired track template 8. The template is marked.

(c) After the track template 8 is generated, the template adapter 1B is slipped over the stationary pipe sleeve 3 adjacent the universal template 1A. The template and pins on the universal template are adjusted to match the pins on the track template and the track is then used with a beveling machine for cutting the work piece.

The direct process of obtaining and transferring the track template 8 includes the following steps:

(B.1) Slip the template adapter 1B over the pipe 40.

(B.2) Position the pipe 40 at the proper orientation relative to the receiving component 41, which the pipe 40 will be joined to.

(B.3) As an alternative, the two previous steps can be replaced by positioning the template adapter 1B at the proper predetermined orientation with respect to the receiving component 41.

(B.4) Push the template adapter 1B against the surface of the receiving component 41 allowing the narrow side 21*a* of the adapter to take the shape of the pipe connection template 9 and the wide side 21*b* to take the shape of the desired track template 8.

(B.5) Lock the pins 21 in place using the locking mechanism 23 and remove the template adapter 1B.

(B.6) Slip the wide side 21*b* of the template adapter 1B over the cylindrical stationary sleeve 3 of the universal template 1A. Mark the track template 8 onto the surface of the cylindrical stationary sleeve 3. Use a marker 43 of which its marking is visible and also erasable, when applied onto the cylindrical stationary sleeve 3.

In order to cut, bevel or weld the pipe end, move the flexible track 2 to follow the marking on the cylindrical stationary sleeve, and then follow all the steps mentioned earlier in the sequence of using the universal template 1 for beveled shape cutting of a pipe end by following the contours of the track 2 with the machine.

The prior art, used in pipe connection layout, requires both connection components to be brought together and positioned at a predetermined orientation with respect to each other. That process requires both time and physical effort that involves moving, lifting, and building temporary fixtures. It also involves tedious measuring. The larger the diameter of the connecting components, the greater the amount of physical work involved.

The invention provides a quick and simple solution for facilitating both connection and track templates for fabricating pipe connections comprising acute angles or offsets or a combination of both.

This invention also pertains to an auxiliary layout tool referred to as the miter table 1C. The miter table 1C provides a quick method for creating the templates for pipe connections involving an offset between the centerline of the work piece and that of the receiving component. The miter table 1C also provides a fast and easy method for creating connection and track templates for pipe connections involving acute angles of intersection between the work piece and the receiving component. It also offers a precise method of generating the track template 8 for pipe connections involving miter cuts.

The miter table 1C as shown in FIGS. 1 and 12–16 consists of a long rigid column 11. The column 11 has a long slotted aperture 11a and an angle indicator 12 that slides along the long slotted aperture 11a, while maintaining its orientation. The column 11 is rigidly connected to a flat table 13 that has a perfectly flat top. The flat table 13 contains a long slotted groove referred to as the guide groove 16. The guide groove 16 enables two guides 14, 15 to slide independently along the guide groove 16 while maintaining faces of the guides 14, 15 perpendicular to flat top and the guide groove 16. An offset ruler 17 is marked or engraved onto the surface of the flat table 13.

An alternative design of the rigid handle 25 includes a longer distance between the column 11 and the adapter 1B, which allows the template adapter 1B to have a wider rotation range, allowing it to record templates for connections involving sharp acute angles without interference with the column 11 of the miter table 1C.

A set of curved plates 18 where the shape of each of the plates simulates a partial pipe or a chunk of a large diameter shell may be used in conjunction with miter table 1C. Each of the curved plates 18 is labeled with a shell size tag 19 showing the nominal or actual diameter of the represented shell. The curved plates 18 are made of plastic or light metal and cover a wide range of pipe and large shell diameters. For example the set of curved plates may include the following plates:

(a) A curved plate 18a that simulates a standard 6" pipe.
(b) A curved plate 18b that resembles a standard 8" pipe.
(c) A curved plate 18c that resembles a standard 10" pipe.
(d) A curved plate 18d that resembles a portion of a standard 2' pipe.
(e) A curved plate 18e that resembles a portion of a standard 6' shell.
(f) A curved plate 18f that resembles a portion of a standard 10' shell.
(g) Other curved plates that resembles various shapes and different sizes of receiving components.

The lightweight and the small size of the curved plates are of great convenience to the user as they minimize the physical effort involved in the template layout process.

As shown in FIG. 15 size tags 18a, 19b, 19c, 19d, 19e, 19f are placed on or engraved onto the surface of each curved plate. Offset indicators 20a, 20b, 20c, 20d, 20e, 20f are placed at the centerline of each curved plate 18. Each curved plate 18 has a flat side that features an indicator, at its mid point. The flat side makes the curved plate stable if placed on the miter table or on top of any flat surface. The offset indicator 20 is placed against the offset ruler 17 to read the lateral offset between the curved plates 18c and the template adapter 1B. As one of the curved plates 18, representing a receiving component, is placed on the flat table 13, the guides 14, 15 are pushed against the two ends of the curved plates 18c to ensure proper alignment. The guides are also used to move the curved plates 18c laterally until the offset indicator 20 reads the desired offset at the offset ruler 17. The pin 29 and the wing nut 29a are used to attach the template adapter 1B to the miter table 1C through the pivot hole 28. As the template adapter 1B pivots around the pivot hole 28, its centerline 26 and the centermark 13a (engraved onto the flat table 13) will always fall in a zero offset plane that is perpendicular to the flat table 13.

The angle indicator 12 travels through the C-shaped protractor window 27 and reads the connection or miter angle at the protractor gradations 27a. Once the angle indicator 12 reads the desired connection angle, the wing nut 29a is tightened to secure the template adapter 1B in place, maintaining its orientation with respect to the flat table 13 (for miter cuts), or the curved plates 18c or the receiving component placed on top of the flat table 13. After the relative positioning is achieved, the user will push the pins of the template adapter 1B to contact the surface of the flat table 13 (for miter cuts), or the surface of curved plates 18c or the receiving component placed on top of the flat table 13. As a result, the narrow side 21a of the adapter records the shape of the pipe connection template 9 and the wide side 21b generates of the desired track template 8.

A sequence of using the miter table 1C with the template adapter 1B to obtain connection templates and track templates, utilized in the fabrication of pipe connections involving miter cuts and offsets, includes the following steps:

(C.1) With the angle indicator 12 placed in the C-shaped protractor window 27, use the pin 29 and the wing nut 29a to connect the template adapter 1B to the miter table 1C through the Pivot hole 28. The template adapter 1B will pivot around the pivot hole 28.

(C.2) Allow the angle indicator 12 to travel through the C-shaped protractor window 27 and read the connection or miter angle at the protractor gradations 27a. Once the angle indicator reads the desired miter or connection angle, the wing nut 29a is tightened to secure the template adapter 1B in place.

(C.3) Place one of the curved plates 18c, representing the receiving component, onto the flat table 13. Push the guides 14, 15 against the two ends of the curved plate 18c to ensure proper alignment. As an alternative, a receiving component is placed on top of the flat table 13.

(C.4) Move the guides 14, 15 holding the curved plate 18c or the receiving component, laterally until the offset indicator 20 reads the desired offset at the offset ruler 17.

(C.5) Push the template adapter 1B to contact the surface of the flat table 13 (for miter cuts), or the surface of one of the curved plates 18, or the receiving component placed on top of the flat table 13, allowing the narrow side 21a of the adapter to record the shape of the pipe connection template 9 and the wide side 21b to generate the desired track template 8.

(C.6) Lock the pins 21 in place using the locking mechanism 23 and remove the template adapter 1B.

(C.7) Transfer the track template 8 onto the surface of the cylindrical stationary sleeve 3. Use a marker 34 that its marking is visible and erasable when used on the cylindrical stationary sleeve 3.

(C.8) As an alternative to the previous step, Slip the wide side 21b of over the cylindrical stationary sleeve 3, then align the flexible track 2 to match the track template 8 at the wide side 21b of the template adapter 1B As before the machine for cutting, welding, or beveling will follow the track for a smooth cut or accurate and uniform weld so that the two pipes can be fitted together.

In an alternative embodiment as shown in FIGS. 21–24 the track 2 can be placed on the universal template 1D for a direct reading of the contour of the pipe being measured such that a machine can follow the track 2 without having an intermediate step of marking a trace on the sleeve 3 and following it with the track on the universal template. This eliminates one step in the process and provides for greater accuracy by eliminating errors introduced in the step.

In a second alternative embodiment as shown in FIG. 25 the universal template 1E the pins 21" have a telescoping angled portion 21c" and a straight portion of a first diameter 21b". The ends of the telescoping portion 21c touch the receiving component 41" to form a track template 8. In this embodiment their is only one pin sleeve 22" and the handle 25" for the miter is attached thereto.

In a another alternative embodiment as shown in FIG. 26 the universal template 1F may have segmented pins 21" for adjusting the end diameter to equal that of the pipe to be cut, beveled, welded or otherwise worked on. The segments 45 can be bent downward and locked into place in selective lengths such that one template adaptor can be used for many different diameters of pipe. This eliminates the need for multiple templates for different diameter pipes. The track may also be used as before for marking a paper template or for marking directly on the sleeve 3.

FIG. 27 shows an embodiment of the invention with the telescoping angled portion 21" pins without an additional straight portion for engaging the pipes to be measured.

FIG. 28 shows an embodiment of the invention with a miter table attached to the handle 25 and a curved plate 18 or a receiving component 41 on the miter table 1C. The miter table can be used with the any of the pin types shown above to obtain a template.

The tracks 2 may be applied to both ends of the pins 21 such that a smother curve may be obtained when coming in contact with the pipe to be contoured 18, 41 as well as for producing a track with a contour to follow.

One advantage of using the invention is that direct measurement of a pipe to form a template provides individual sizing for the pipe to be cut and installed. Standard size metal guide templates would not account for variations in pipe sizes or the variation of the geometry of the receiving component, or the variation of relative orientation of the connection components.

In another embodiment the diameter of the ends of the template can be adjusted by pivoting the angles portion of the pins without changing the length of the angled portion of the pins which engage the receiving component.

Obviously, many modifications and variations of the present invention are possible in light of the above teachings. It is therefore to be understood that, within the scope of the appended claims, the invention may be practiced otherwise than as specifically described.

What is claimed is:

1. A template comprising:
a plurality of pins cylindrically arrayed,
a pin sleeve for engaging and slideably holding the pins in the cylindrical array,
the pin sleeve having a locking mechanism to fix the pins in their relative positions when desired,
an adjustable length flexible track attached to a first end of the pins for forming a closed loop template, the track having a first fixed end and a second free end, the first fixed end being tapered to create a smooth joint as it forms the closed loop with the second free end, so as to allow for the adjustability of the length of the track, as the pins are moved along a longitudinal axis of the cylinder relative to each other.

2. A template as in claim 1 wherein,
a cylindrical stationary sleeve for engaging and holding the pin sleeve such that the pins and flexible track can be held in a fixed position, the cylindrical stationary sleeve having a means for engaging a tool with a working device which follows the contour of the template.

3. A template as in claim 2 wherein,
a marking on the cylindrical stationary sleeve such that the pins are adjusted according to the marking to form the template.

4. A template as in claim 2 wherein,
the adjustable length flexible track has a tapered first end for overlapping a portion of the track to form a smooth surface template over the ends of the pins such that it can guide a roller or other device for following the template for a tool to be guided to work on a work piece such that there is a smooth junction of the tapered first end and the flexible track, and the loose end of the flexible track allows for the adjustment of the template length.

5. A template as in claim 4 wherein,
a second flexible adjustable length track is attached to the pins at a second end of the pins.

6. A template as in claim 1 wherein,
the pins have a first straight portion, an angled portion and a second straight portion wherein the first straight portions form a cylinder of a first diameter, the second straight portions form a cylinder of a second diameter, the angled portions connect the first and second straight portions,
the pin sleeve for slideably engaging the cylindrical array of pins at the first diameter and a second pin sleeve for slideably engaging the cylindrical array of pins at the second diameter.

7. A template as in claim 6 wherein,
the angled portion and at least one straight portion have adjustable segmented sections for adjusting the length of the angled portion to adjust the diameter of the second cylinder relative to the fixed diameter of the first straight portion attached to the cylindrical stationary sleeve.

8. A template as in claim 7 wherein,
a handle for connecting the pin sleeve to the second pin sleeve.

9. A template as in claim 8 wherein,
a miter table attached to the handle, the miter table having a column rotatably attached to the handle for setting the angle of the miter table, a table at the end of the arm for engaging a work piece, the column having a slot for adjusting the length of the table from handle.

10. A template as in claim 9 wherein,
the table having a work piece holder linearly adjustable for offsetting a center line of the work piece from a center line of the cylinders of the template adaptor.

11. A template as in claim 9 wherein,
sections of surfaces to be measured for templates representing objects impractical to fit in the miter table can be used to represent larger articles for making templates thereof such that templates can be made for objects too big, too heavy or otherwise unavailable for being present to act as the direct model of the object.

12. A template as in claim 7 wherein,
the second pin sleeve has an adjustable diameter and the handle correspondingly adjusts to the second pin sleeve new diameter.

13. A template as in claim 7 wherein,
the second pin sleeve has a locking mechanism to lock the pins in place.

14. A template as in claim 1 wherein, the pins have a straight portion and an angled portion connected to the straight portion, wherein the straight portions form a cylinder of a first diameter, the angled portions are telescopically adjustable for changing the length of the angled portion to adjust the diameter of their free ends such that the free ends of the telescoping portion touch a receiving component to form a template thereof.

15. A template as in claim 14 wherein, a handle is attached to the pin sleeve such that a miter table can be attached thereto.

16. A template comprising:

a plurality of pins cylindrically arrayed, the pins have a first straight portion, an angled portion and a second straight portion wherein the first straight portions form a cylinder of a first diameter, the second straight portions form a cylinder of a second diameter, the angled portions connect the first and second straight portions, a pin sleeve for slideably engaging the cylindrical array of pins at the first diameter and a second pin sleeve for slideably engaging the cylindrical array of pins at the second diameter, a locking mechanism on the pin sleeve for locking the pins in place, such that a work piece engaging the end pins of the second diameter will form a template of a different predetermined size at the end of the pins of the first diameter, making it easy to make templates for tools to use for cutting, beveling or welding tools to follow and for other uses.

17. A template as in claim 16 wherein, a handle for connecting the pin sleeve to the second pin sleeve.

18. A template as in claim 17 wherein, a miter table attached to the handle, the miter table having a column rotatably attached to the handle for setting the angle of the miter table, a table at the end of the arm for engaging a work piece, the column having a slot for adjusting the length of the table from the handle.

19. A method of forming templates for tools to use comprising:

holding a plurality of pins in a pin sleeve attached to a cylindrical stationary sleeve which fixes the pins in a radial position around a center line such that the pins form a cylinder, attaching a smooth faced adjustable length flexible track to one end of the plurality of pins, forming a closed loop template of the smooth faced flexible track by adjusting the length of each pin relative to the adjacent pins longitudinally along the axis of the cylinder while adjusting the length of the adjustable flexible track, the track having a first fixed end and a second free end, the first fixed end being tapered to create a smooth joint as it forms the closed loop with the second free end, so as to allow for the adjustability of the length of the track, and locking the pins in position relative to the pin sleeve such that the template remains fixed.

20. A method of forming templates for tools as in claim 19 further comprising the step of:

attaching a work tool having a roller for following the template to the cylindrical stationary sleeve, such that the tool can work on a workpiece by following the template.

21. A method of forming templates for tools as in claim 19 further comprising the step of:

adjusting the position of the pins by placing one end of the pins in contact with the surface of an object to form a template of the surface of the object.

22. A method of forming templates for tools as in claim 21 further comprising the step of:

using pins having an angled portion between two straight portions to form a first diameter cylinder and a second diameter cylinder such that a corresponding tracking template of the first diameter cylinder is formed on the second diameter cylinder.

23. A method of forming templates for tools as in claim 22 further comprising the step of:

adjusting the angled portion of the pins to change the relative diameters.

24. A method of forming templates for tools as in claim 22 further comprising the step of:

holding the plurality of pins in two pin sleeves connected to a handle and attaching miter table to the handle for positioning the workpiece such that miter cuts and off center cuts can be made using the template formed by use of the miter table holding the receiving component or on the surface of a miter table.

25. A method of forming templates for tools as in claim 24 further comprising the step of:

using a set of curved plates held in the miter table, wherein the shape of each of the plates simulates a shape of a connection component.

26. A method of forming templates for tools as in claim 19 further comprising the step of:

adjusting the position of the pins by placing one end of the pins adjacent a marking to form a tracing template to guide a working tool.

27. A method of forming templates for tools as in claim 26 further comprising the step of:

forming a tracking template for a work device on the cylindrical stationary sleeve by using pins having an angled portion between two straight portions to form a first diameter cylinder equal to that of the engaging diameter of the tracing device and a second diameter cylinder equal to that of the pipe to be cut such that a template formed at the second diameter cylinder, by engaging the receiving component with pin ends of the second straight portion, results in a corresponding track template formed at the first diameter.

* * * * *